United States Patent [19]

Peter-Hoblyn et al.

[11] Patent Number: 6,003,303
[45] Date of Patent: Dec. 21, 1999

[54] METHODS FOR REDUCING HARMFUL EMISSIONS FROM A DIESEL ENGINE

[75] Inventors: Jeremy D. Peter-Hoblyn, Bodwin, United Kingdom; James M. Valentine, Fairfield; Barry N. Sprague, Bethlehem, both of Conn.; W. Robert Epperly, Mountainview, Calif.

[73] Assignee: Clean Diesel Technologies, Inc., Stamford, Conn.

[21] Appl. No.: 08/514,978

[22] Filed: Aug. 14, 1995

Related U.S. Application Data

[63] Continuation-in-part of application No. 08/501,763, Jul. 13, 1995, abandoned, which is a continuation-in-part of application No. 08/003,245, Jan. 11, 1993, abandoned.

[51] Int. Cl.$^6$ ..................................................... F01N 3/00
[52] U.S. Cl. ................................ 60/274; 60/295; 60/299
[58] Field of Search ............................ 60/295, 274, 299, 60/278

[56] References Cited

U.S. PATENT DOCUMENTS

| | | | |
|---|---|---|---|
| 4,462,208 | 7/1984 | Hicks | 60/303 |
| 4,655,037 | 4/1987 | Rao | 60/295 |
| 5,266,083 | 11/1993 | Peter-Hoblyn | 44/358 |
| 5,584,894 | 12/1996 | Peter-Hoblyn | 44/357 |

OTHER PUBLICATIONS

McCabe, et al; Oxidation of Diesel Particulates by Catalyzed Wall–Flow monolith Filters. 2. Regeneration Characteristics of Platinum–Lithium Catalyzed Filters; SAE Paper No. 872137, 1987.

Murphy, et al; Assessment of Diesel Particulate Control—Direct and Catalytic Oxidation;; Society of Engineers (SAE) Paper No. 810112, 1981.

Snider, et al; Control of Diesel Engine Exhaust Emissions in Underground Mining; 2nd U.S. Mine Ventilation Symposium, Reno, Nevada, Sep. 23–25, 1985, p. 637.

*Primary Examiner*—Thomas E. Denion
*Attorney, Agent, or Firm*—St. Onge Steward Johnston & Reens LLC

[57] ABSTRACT

Emissions of pollutants from diesel engines are reduced by a combination of mechanical devices and fuel additives. In one series of embodiments, diesel emissions of $NO_x$ and particulates are reduced, simultaneously with gaseous hydrocarbons and carbon monoxide, by the combined use of exhaust gas recirculation or engine timing modification, with a particulate trap and a platinum group metal catalyst composition. In another embodiment, a multi-metal catalyst composition, comprising a combination of a platinum metal catalyst composition and at least one auxiliary catalyst metal composition, especially cerium or copper, is employed to provide catalyst metal to the exhaust system including a diesel trap to lower the balance point of the particulate trap (the temperature at which the rate of trap loading equals the rate of regeneration) while also lowering the emissions of carbon monoxide and unburned hydrocarbons. Data for platinum, copper and cerium catalysts establishes effective amounts. Tests also show selective maintenance of low oxidation of $SO_2$ to $SO_3$.

22 Claims, 7 Drawing Sheets

METHODS FOR REDUCING HARMFUL EMISSIONS FROM A DIESEL ENGINE

RELATED APPLICATIONS

This application is a continuation-in-part of commonly assigned U.S. patent application Ser. No. 08/501,763, entitled "Method for Reducing Harmful Emissions from a Diesel Engine Equipped with a Particulate Trap" filed Jul. 13, 1995, by Peter-Hoblyn, Valentine and Epperly, now abandoned, which in turn is a continuation-in-part of copending and commonly assigned U.S. patent application Ser. No. 08/003,245 entitled "Method for Reducing Harmful Emissions from a Diesel Engine Equipped with a Particulate Trap" filed Jan. 11, 1993, by Peter-Hoblyn, Valentine and Epperly, now abandoned.

The above-noted U.S. patent application Ser. No. 08/501, 763 entitled, "Method for Reducing Harmful Emissions from a Diesel Engine Equipped with a Particualte Trap" was refiled Jan. 2, 1997 as U.S. patent application Ser. No. 08/778,860. Also, U.S. patent application No. 08/503,909 entitled "Method for Reducing Harmful Em,issions from a Diesel Engine Equipped with a particulate Trap" filed Jul. 18, 1995 by Peter-Hoblyn, Valentine, Sprague and Epperly, now abandoned, is a continuation-in-part of the above-noted 08/501,763, now abandoned. U.S. patent application Ser. No. 08/503,909 was refiled as U.S. patent application Ser. No. 08/760,385 on Dec. 4, 1996.

TECHNICAL FIELD

Despite the relative economy and thermodynamic efficiency of diesel engines, more widespread use will be deterred until a reasonable solution is found to their tendency to discharge pollutants. The invention provides solutions to these problems by the combined use of mechanical devices and fuel additives.

The economical and the ecological advantages offered by diesel engines will not be fully realized until technology becomes available to reduce all pollutant species found in diesel engine exhaust. These pollutants include carbon monoxide (CO), unburned hydrocarbons (HC), particulates, and nitrogen oxides (NOJ. The particulates are typically reduced by equipping diesel engines with particulate traps, mounted in the exhaust stream, to "trap" or otherwise collect particulates from the exhaust to prevent their emission to the atmosphere. Traps alone cannot handle all of the emissions, and it has been difficult to find the right combination of pollution control measures because the various forms of pollutants seem to be interrelated.

Catalytic oxidizers have been proposed to reduce the emission of particulates and gaseous hydrocarbons and carbon monoxide from diesel engines. These devices do not trap the particulates, but are primarily intended to oxidize what is referred to as the soluble organic fraction (SOF) of particulates while preferably also oxidizing unburned hydrocarbons and carbon monoxide to reduce emissions of these. Flow-through catalytic oxidizers direct the flow of particulates through a maze of catalyzed surfaces which contact the particulates without either trapping them as done by diesel particulate traps or reducing $NO_x$ the way triple effect catalysts do for gasoline engines.

There is a trade-off between particulates and nitrogen oxides—when combustion conditions are modified to favor low nitrogen oxides emissions, particulates are increased. For example, when $NO_x$ reduction is attempted by modifying engine timing and/or recirculating exhaust gas, particulates are increased. Particulate traps do not directly increase $NO_x$, but have been associated with increased production of carbon monoxide. And, even with a trap, unburned hydrocarbons remain a problem.

Another complication is that, as diesel traps perform their work of collecting the particulates, back pressure increases across the trap until the trap must be replaced or regenerated. In some exhaust systems, regeneration is effected by burning the particulates in place on the trap by the use of auxiliary heaters. Regeneration by burning is not fully effective because exhaust temperatures are not high enough for continuous regeneration throughout normal operation, and the addition of electric heaters is not practical for most applications. The use of catalyzed traps has not provided an effective solution because they tend to become inactivated and to oxidize $SO_2$ to $SO_3$. Inactivation results in an expense on the order of that for replacing the trap in the first instance. The production of sulfate causes an increase in particulates because the $SO_3$ tends to dissolve in water vapor condensed on the particulates. Again, an attempt to solve one problem can create another.

Various fuel additives have been proposed to reduce one or more of the noted pollutants or to solve a problem related to diesel traps; however, the achievement of lower emissions of $NO_x$, unburned hydrocarbons, and carbon monoxide, while controlling particulates over reasonable periods of time, continues to present a technical challenge.

BACKGROUND ART

Diesel particulates, their effect and control, are at the center of much concern and controversy. Their chemistry and environmental impact present complex issues. Very generally, diesel particulate matter is principally solid particles of carbon and metal compounds with adsorbed hydrocarbons, sulfates and aqueous species. Among the adsorbed species are aldehydes and polycyclic aromatic hydrocarbons (also called PAH's). Some of these organics, as well as the particulates themselves, have been reported to be potential carcinogens. Unburned hydrocarbons are related to the characteristic diesel odor and include aldehydes such as formaldehyde and acrolein. The aldehydes, like the carbon monoxide, are the products of incomplete combustion.

It is not just these organics which are of concern, all particulates are subject to question. In one study, diesel particulates were tested along side $TiO_2$ and carbon without any adsorbed hydrocarbons. (U. Heinrich, et al, "Tierexperimentelle Inhalationsstudien Zur Frage der Tumorinduzierenden Wirkung von Dieselmotorabgasen und zwei Teststauben", Oklolgische Forschung BMFT/GSF, Munich, 1992) The reporters determined that all species tested showed carcinogenic tendency. Until further work clarifies this matter, it would be prudent to look for systems which could control all particulates—regardless of composition.

Unfortunately, increasing the recovery of particulates simply by modifying trap design or size would increase the rate of back pressure buildup within the trap. Moreover, the various pollutants seem to be interrelated. With reduction of one sometimes increasing levels of another. By modifying combustion to achieve more complete oxidation, decreases can be achieved for pollutants resulting from incomplete combustion, but $NO_x$ is typically increased under these conditions.

$NO_x$, principally NO and $NO_2$, contributes to smog, ground level ozone formation and acid rain. NO is produced in large quantities at the high combustion temperatures associated with diesel engines. The $NO_2$ is formed principally by the post oxidation of NO in the diesel exhaust stream. Several attempts have been made to reduce $NO_x$, such as by retarding engine timing, exhaust gas recirculation, and the like; however, with current technology, there is a tradeoff between $NO_x$ and particulates. For example, exhaust gas recirculation and engine timing changes can reduce the temperature of combustion to thereby decrease $NO_x$ formation, but combustion is also affected. When $NO_x$ is reduced by these techniques, particulate emissions tend to increase. And, as noted, conditions favoring low emissions of $NO_x$ often favor production of increased levels of CO and HC.

Traps are reasonably effective for controlling particulates, but uncatalyzed traps increase carbon monoxide and catalyzed traps increase the discharge of $SO_3$ (adding to the weight of particulates) and suffer from other problems. Traps, of course, don't reduce $NO_x$ and efforts made to control $NO_x$ must be carefully selected or the result might be to further increase particulates or other products of incomplete combustion.

Catalyzed diesel traps are not to be equated with triple-effect catalytic converters of the type used for gasoline engines. Triple-effect catalytic converters of this type simply don't work for diesel engines due to the different manner of operation and the different composition of exhaust gases. Reference is made to the following patent publications related to catalyst technology for gasoline engines: U.S. Pat. No. 5,387,569, U.S. Pat. No. 5,386,690, U.S. Pat. No. 5,322,671, WO 94/22983, WO 94/22577 and WO 94/09431. Thus, while these patent publications indicate that catalyst metals can be introduced into gasoline fuel or the combustion air for it, this technology is not the answer to the problems discussed above with regard to the tradeoffs encountered when dealing with the polluting emissions from diesel engines.

The use of diesel traps and the need to improve them has resulted in a great deal of research and a great number of patents and technical publications. The traps are typically constructed of metal or ceramic and are capable of collecting the particulates from the exhaust and withstanding the heat produced by oxidation of carbonaceous deposits which must be burned off at regular intervals.

This burning off, or regeneration, could occur by itself if the operating temperature of the trap were sufficiently high. However, in the typical situation, the exhaust temperature is not constantly high enough, and secondary measures such as electrically heating to raise the trap temperature, using a catalyst to reduce the combustion temperature, supplemental burners, and exhaust gas throttling have been attempted. Electrical heaters create intense loads on batteries, most needed at lower power settings where the electrical output is also low. Supplemental heaters and exhaust gas throttling can lower efficiency.

The uses of exhaust gas oxidation catalysts and catalyzed diesel particulate traps to enhance burn-off or regeneration, have taken many forms, but none has been found to be fully satisfactory. While exhaust gas oxidation catalysts can be very effective in reducing carbon monoxide and unburned hydrocarbons, they are either too easily fouled, catalyze the oxidation of $SO_2$ to $SO_3$ (which then combines with water and increases the weight of particulates), typically burn off only the soluble organic fraction of the particulates, or have two more of these shortcomings. No catalytic device is known which can collect particulates and burn them off at a practical low temperature while reducing oxidation of $SO_2$ to $SO_3$ and also decreasing the emissions of gaseous hydrocarbons and carbon monoxide.

In "A New Generation of Diesel Oxidation Catalysts", Society of Automotive Engineers (SAE) Paper No. 922330, 1992, R. Beckman, et al., assert that the technical challenge is to find a catalyst which selectively catalyzes the oxidation of carbonaceous components at low exhaust temperatures typical of diesels operating at partial load, and does not oxidize sulfur dioxide or nitrogen oxide at high load temperatures. They described tests studying the aging of platinum-catalyzed cordierite honeycomb traps, and concluded, inter alla, that the aging was related to adsorption of sulfur and that this depended on both the sulfur content of the fuel and the phosphorous content of the lubricating oil. With control of both of these, aging could be slowed. However, sulfur will remain in diesel fuels, even with planned reduction to 0.05%, and there will remain a need for a means to maintain the activity of catalysts for reducing emissions of carbon monoxide and unburned hydrocarbons, and reducing the ignition temperature of loaded traps. There is no indication that the combined use of mechanical devices and fuel additives could either: (1) reduce $NO_x$ emissions and particulates simultaneously; or (2) reduce the temperature necessary for regenerating a particulate trap while also reducing the emissions of carbon monoxide and unburned hydrocarbons.

In "Control of Diesel Engine Exhaust Emissions in Underground Mining", 2nd U.S. Mine Ventilation Symposium, Reno, Nevada, Sep. 23–25, 1985, at page 637, S. Snider and J. J. Stekar report that precious metal catalysts in a catalytic trap oxidizer and a "catalyzed Corning trap" were effective in the capture of particulate matter, but both systems increased the conversion of $SO_2$ to $SO_3$. The increase in the rate of oxidation of the benign, gaseous dioxide form to the trioxide form results in the adsorption of greater amounts of acid sulfates and associated water onto discharged particulates. Thus, the weight of the particulates is increased, and the difficulty in reaching regulatory compliance is increased.

The Snider, et al., report also discussed several other approaches, including the use of a fuel additive containing 80 ppm manganese and 20 ppm copper to reduce the regeneration temperature of the trap. While this was effective in reducing the particulate ignition temperature, no measurable reductions in carbon monoxide, unburned hydrocarbons or $NO_x$ were noted. Moreover, where Snider, et al., also indicate that precious metal catalysts could be expected to increase the oxidation of $SO_2$ to $SO_3$, these measures do not address an overall solution to the diesel emission problem.

A number of fuel additives have been proposed for adding to diesel fuels to affect the nature of particulates deposited on diesel traps or otherwise improve the collection or disposition of the particulates. For example, U.S. Pat. Nos. 5,360,459 and 5,374,154, describe the use of copper-containing organometallic complexes which, when added to diesel fuel, tend to reduce the ignition temperature of exhaust particulates. Again, these additives do not lower carbon monoxide and unburned hydrocarbons. In another similar teaching, U.S. Pat. No. 4,458,357 describes the use of a fuel additive containing cerium and manganese to reduce the quantity of particulate material necessary to sustain combustion of the particulates on the trap—once combustion is initiated by a glow plug. In U.S. Pat. No. 5,034,020, fuel-soluble platinum additives are disclosed to provide or replenish catalyst metals on a diesel trap to facilitate burning off of trapped particulates. In U.S. Pat. No. 5,322,671, a catalyst comprising platinum, rhodium or rhenium is added directly to a special catalyst chamber, meant to replace a conventional gasoline engine three-way catalytic converter. This patent does not address the issue of particulate emissions from diesel engines. And, again, none of these patents address an overall solution to the diesel emission problem.

In "Assessment of Diesel Particulate Control—Direct and Catalytic Oxidation", *Society of Automotive Engineers (SAE) Paper No.* 81 0112, 1981, Murphy, Hillenbrand, Trayser, and Wasser have reported that the addition of catalyst metal to trapped particulates can decrease the particulate ignition temperatures. Neither this disclosure nor any of the others above, however, indicate or suggest specific combinations of mechanical means and fuel additives that can reduce particulates and $NO_x$ at the same time, or a combination of fuel additives which can reduce the balance point temperature of the particulates trapped on a diesel trap significantly while also significantly reducing emissions of unburned hydrocarbons and carbon monoxide. Especially, none of these disclosures indicate any recognition that catalysts can be effective for these purposes and also provide, over time, the selective oxidation of fuel sulfur to $SO_2$ without inactivation of the catalyst.

In a 1987 report on catalyzed traps, R. W. McCabe and R. M. Sinkevitch summarized their studies of diesel traps catalyzed with platinum and lithium, both individually and in combination. (Oxidation of Diesel Particulates by Catalyzed Wall-Flow Monolith Filters. 2. Regeneration Characteristics of Platinum, Lithium, and Platinum-Lithium Catalyzed Filters; *SAE Technical Paper Series*-872137) They noted that carbon monoxide conversion to the dioxide was negligible over the lithium filter, good for platinum, but good only initially for the combined catalyst. They further noted that platinum undergoes a reversible inhibition due to the presence of $SO_2$, but in the presence of the lithium catalyst there is apparently a wetting of the platinum crystallites by $Li_2O_2$. From this work, it can be seen that platinum and lithium on their own help burn particulates at low temperature, but not necessarily low enough to make supplemental heat unnecessary.

In a more recent report, B. Krutzsch and G. Wenninger discussed their investigation of sodium and lithium-based fuel additives. (Effect of Sodium- and Lithium-Based Fuel Additives on the Regeneration Efficiency of Diesel Particulate Filters, *SAE Technical Paper Series* 922188, 1992) They noted that the predominantly used diesel additives were based on transition metals such as iron, copper, and manganese. The transition metals were seen to form oxides which foul the traps and cannot be easily removed. They found that the sodium and lithium additives permitted regeneration at temperatures low enough to possibly eliminate the need for supplementary heat, and did, therefore, have some promise in improving trap operation as was achieved previously with the transition metal catalysts. However, they also pointed out that there was no effect on the gaseous components, thus both carbon monoxide and unburned hydrocarbon levels remained higher than would be desired.

There is a present need for an improved means in the form of for rendering the exhaust from diesel engines more environmentally benign by the combined use of mechanical devices and fuel additives. In particular, there is a need for improvements which can: in one embodiment, reduce $NO_x$ emissions and particulates simultaneously; and, in another, reduce the temperature necessary for regenerating a particulate trap while also reducing the emissions of carbon monoxide and unburned hydrocarbons.

DISCLOSURE OF INVENTION

The invention relates to improvements in reducing emissions of pollutants from diesel engines, preferably equipped with a diesel particulate trap, by providing platinum group metal catalysts in the exhaust gases of the engines. This is variously accomplished by adding the platinum group metal catalyst, such as part of an additive composition containing a platinum group metal catalyst composition, either alone or with an auxiliary catalytic metal, to the diesel fuel, to the combustion air, or to the exhaust or combustion gases. Through the use of mechanical modifications, with the catalysts, it is possible to reduce the emissions of $NO_x$, unburned hydrocarbons, carbon monoxide and particulates by significant amounts.

In one embodiment, diesel emissions of $NO_x$ and particulates are reduced, simultaneously with gaseous hydrocarbons and carbon monoxide, by the combined use of exhaust gas recirculation, a particulate trap, and a platinum group metal catalyst composition, alone or with an auxiliary catalytic metal.

In a related embodiment, diesel emissions of $NO_x$ and particulates are reduced, simultaneously with gaseous hydrocarbons and carbon monoxide, by the combined use of retarding engine timing, a particulate trap, and a platinum group metal catalyst composition, alone or with an auxiliary catalytic metal.

In another embodiment, a multi-metal catalyst composition, comprising a combination of a platinum metal catalyst composition and at least one auxiliary catalyst metal, is added to the diesel fuel prior to combustion to provide catalyst metal to the exhaust system including a diesel trap to lower the balance point of the particulate trap (the temperature at which the rate of trap loading equals the rate of regeneration) while also lowering the emissions of carbon monoxide and unburned hydrocarbons. The results in both embodiments are achieved while, preferably, selectively maintaining a low oxidation of $SO_2$ to $SO_3$.

It is an advantage of the invention that the benefits achievable for the platinum group metals (including reductions in hydrocarbons, carbon monoxide, and trap balance point temperature) are not adversely affected by the presence of auxiliary catalysts, making it possible to obtain the positive benefits of both the platinum group metal catalyst and the auxiliary catalyst.

The first embodiment comprises: adding a platinum group metal composition and a cerium compound to a diesel fuel in an effective amount to lower the emissions of unburned hydrocarbons and carbon monoxide and to lower the temperature at which particulates are burned from the trap; operating the diesel engine by burning the fuel over a sufficient period of time to produce exhaust gases and achieve a sustained reduction in unburned hydrocarbons and carbon monoxide; and passing the exhaust gases from the operation of the engine through the diesel trap whereby particulates are collected in the trap and burned therein at a temperature lower than could be achieved in the absence of the platinum group metal and the cerium.

In another embodiment, the operation of a diesel engine is improved by lowering the emissions of unburned hydrocarbons and carbon monoxide, comprising: providing a diesel fuel and combustion air; providing a platinum group metal catalyst composition selected from the group consisting of alcoholates, sufonates, beta-diketonates, soaps, and mixtures of these; combusting the fuel in a diesel engine to produce exhaust gases; and, directing exhaust gases into an exhaust system, wherein the platinum group metal catalyst composition is introduced into the fuel, exhaust gases or combustion air, in amounts effective to provide platinum group metal in the exhaust system at a level of up to 1 ppm based on the volume of fuel burned to produce the exhaust gases.

In another of its aspects, the invention provides a method for operating a diesel engine with reduced emissions of $NO_x$, particulates, gaseous hydrocarbons and carbon monoxide, comprising: providing a diesel engine and a source of diesel fuel; providing a combustion air mixture including incoming air and exhaust gases from a previous combustion cycle of the engine; providing a platinum group metal catalyst composition and an auxiliary catalytic metal composition comprising cerium; introducing the combustion air mixture into the cylinder of a diesel engine; compressing the combustion air within the cylinder; injecting the diesel fuel into the cylinder of a diesel engine; combusting the fuel to produce exhaust gases; directing the exhaust gases into an exhaust system including a diesel trap to remove particulates from the exhaust gases; and, mixing a portion of the exhaust gases with incoming combustion air to provide a combustion air mixture for a subsequent combustion cycle; wherein the amount of exhaust gases present in the combustion air mixture in the cylinder of the diesel engine is effective to lower the production of $NO_x$ by the engine utilizing said combustion air mixture as compared to combustion air not containing exhaust gases; and wherein a platinum group metal catalyst composition and the auxiliary catalytic metal composition are present in the fuel, combustion air mixture, or exhaust gases in amounts effective to provide sufficient platinum group metal and auxiliary catalyst metal in the exhaust system to lower the emissions of unburned hydrocarbons and carbon monoxide and to lower the balance point of the trap.

The invention provides in another of its aspects, a method for improving the operation of a diesel engine including a diesel trap by lowering the emissions of $NO_x$, unburned hydrocarbons and carbon monoxide, while also reducing the balance point of the trap, the method comprising: providing a diesel engine and a source of diesel fuel; providing a platinum group metal catalyst composition and an auxiliary catalytic metal composition containing copper and/or cerium; introducing combustion air into the cylinder of a diesel engine; compressing the combustion air within the cylinder; injecting the diesel fuel into the cylinder of a diesel engine, the injection timing of the diesel engine being set in a manner designed to reduce the nitrogen oxides emissions from the engine after combustion of a diesel fuel; combusting the fuel to produce exhaust gases containing particulates and platinum group metal catalyst and an auxiliary catalytic metal; and, directing exhaust gases into an exhaust system including a diesel trap which removes at least a portion of the particulates from the exhaust gases, wherein the platinum group metal catalyst composition and the auxiliary catalytic metal composition are introduced into the fuel, exhaust gases or combustion air, in amounts effective to provide sufficient platinum group metal and auxiliary catalyst metal in the exhaust system to lower the balance point temperature of particulates in the trap and to reduce emissions of unburned hydrocarbons and carbon monoxide.

Also provided by the invention is a method for improving the operation of a diesel engine exhaust system comprising: adding a platinum group metal composition and at one least auxiliary catalytic metal composition selected from the group consisting of compounds of sodium, lithium, potassium, calcium, magnesium, cerium, iron, copper, manganese, and mixtures of these, to a diesel fuel in effective amount such that exhaust produced by combustion catalyzes the exhaust system including a diesel trap effectively to lower the emissions of unburned hydrocarbons and carbon monoxide; operating a diesel engine by burning the fuel; and passing the exhaust from the operation of the engine through the exhaust system including the diesel trap to reduce emissions of hydrocarbons and carbon monoxide and reduce the balance point for a trap.

In yet another of its aspects, the invention provides a method for improving the operation of a diesel engine including a diesel trap by lowering the emissions of $NO_x$, unburned hydrocarbons and carbon monoxide, while also reducing the balance point of the trap, the method comprising: providing a diesel engine and a source of diesel fuel; providing a platinum group metal catalyst composition and an auxiliary catalytic metal composition containing cerium; introducing combustion air into the cylinder of a diesel engine; compressing the combustion air within the cylinder; injecting the diesel fuel into the cylinder of a diesel engine, thereby combusting the fuel to produce exhaust gases containing particulates and platinum group metal catalyst and cerium catalyst; and, directing exhaust gases into an exhaust system including a diesel trap which removes at least a portion of the particulates from the exhaust gases, wherein the platinum group metal catalyst composition and the auxiliary catalytic metal composition are introduced into the fuel, exhaust gases or combustion air, in amounts effective to provide sufficient platinum group metal and cerium catalyst in the exhaust system to lower the balance point temperature of particulates in the trap and to reduce emissions of unburned hydrocarbons and carbon monoxide.

And, in another embodiment, the invention provides a method for improving the operation of a diesel engine including a diesel trap by lowering the emissions of $NO_x$, unburned hydrocarbons and carbon monoxide, while also reducing the balance point of the trap, the method comprising: providing a diesel engine and a source of diesel fuel; providing a platinum group metal catalyst composition and an auxiliary catalytic metal composition selected from the group consisting of compounds of sodium, lithium, potassium, calcium, magnesium, cerium, iron, copper, manganese, and mixtures; introducing combustion air into the cylinder of a diesel engine; compressing the combustion air within the cylinder; injecting the diesel fuel into the cylinder of a diesel engine, thereby combusting the fuel to produce exhaust gases containing particulates and platinum group metal catalyst and auxiliary catalytic metal; and, directing exhaust gases into an exhaust system including a diesel trap which removes at least a portion of the particulates from the exhaust gases, wherein the platinum group metal catalyst composition and the auxiliary catalytic metal composition are introduced into the fuel, exhaust gases or combustion air, in amounts effective to provide sufficient platinum group metal and auxiliary catalytic metal in the exhaust system to lower the balance point temperature of particulates in the trap and to reduce emissions of unburned hydrocarbons and carbon monoxide.

Preferably the exhaust system in each of the embodiments will be selectively catalyzed, meaning that it will have the designated advantages in terms of hydrocarbon and carbon monoxide reduction while causing less conversion of $SO_2$ to $SO_3$ than a trap catalyzed with platinum prior to operation. The platinum group metal catalyst can be added in any manner effective, such as by adding it to the fuel in bulk storage, to the fuel in a tank associated with the engine, or by continuous or intermitent addition, such as by a suitable metering device, into: the fuel line leading to the engine, or in the form of a vapor, gas or aerosol into the air intake, the exhaust gases before the trap, exhaust gases after the trap but before recirculation to the engine, or a mixing chamber or equivalent means wherein the exhaust gases are mixed with incoming air.

The platinum group metal catalyst composition is preferably employed at a level of less than 1 part by weight of platinum group metal per million parts by volume fuel (ppm). For the purposes of this description, all "parts per million" figures are on a weight to volume basis, i.e., grams/million cubic centimeters (which can also be expressed as milligrams/liter), and percentages are given by weight, unless otherwise indicated. The auxiliary catalyst metal composition can be employed to deliver the auxiliary catalyst metal at suitable levels, e.g., from about 1 to about 100 ppm and preferably 20 to 60 ppm of the catalyst metal in combination with the platinum group metal composition in diesel fuels. It is preferred to add the platinum group metal catalyst and the auxiliary catalyst metal to the fuel in amounts effective to reduce the balance point temperature of the trap by at least 50° C., and preferably by at least 150° C.

DESCRIPTION OF THE DRAWINGS

The invention will be better understood and its advantages will be more apparent when the following detailed description is read in light of the accompanying drawings, wherein.

DETAILED DESCRIPTION OF THE PREFERRED EMBODIMENT

Figure 1:
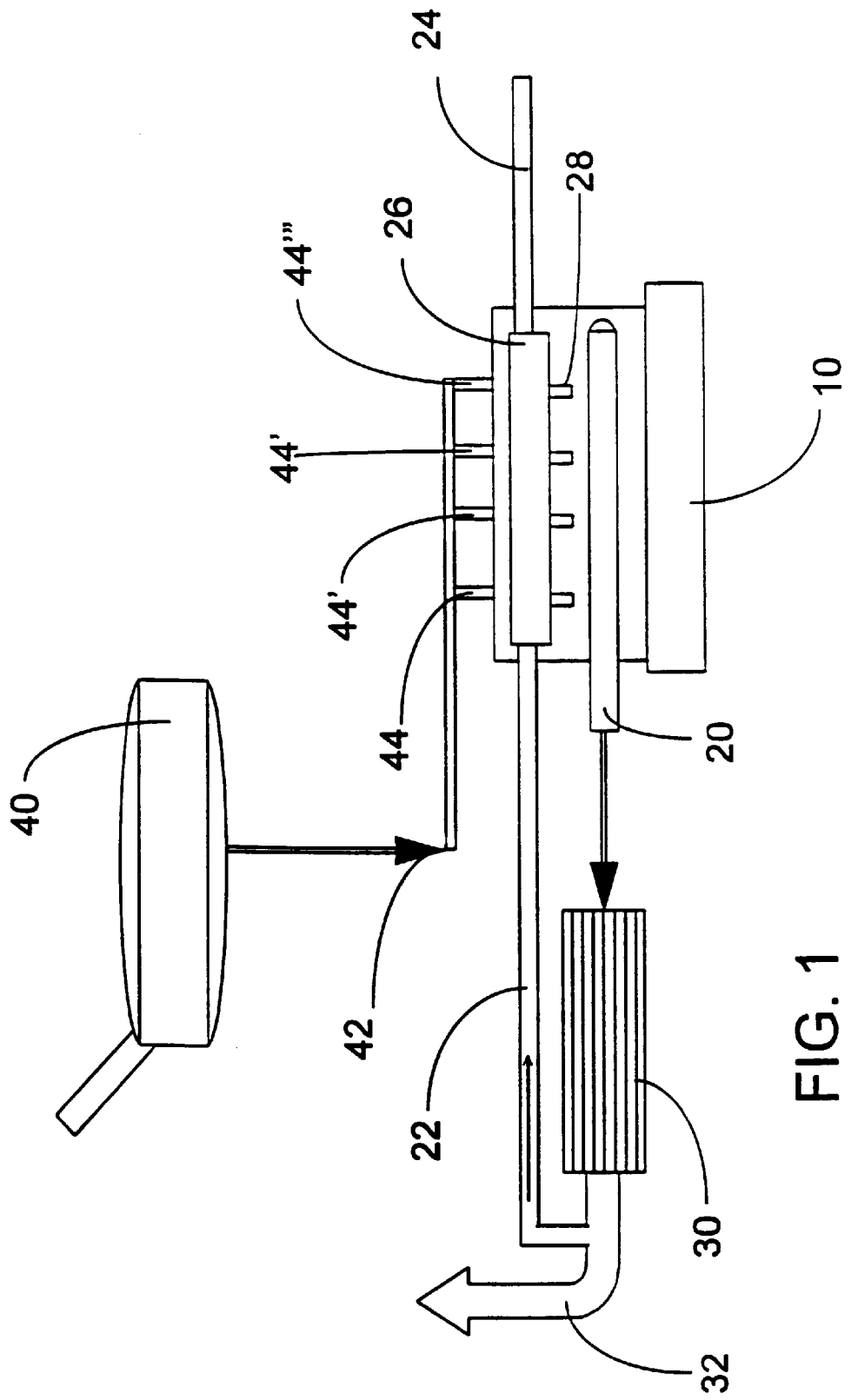
FIG. 1 is a schematic view of an embodiment of the invention wherein a portion of the exhaust gas, produced by the combustion of diesel fuel catalyzed with at least a platinum group metal catalyst composition, is recirculated to the combustion chamber of the illustrated diesel engine to lower $NO_x$ and achieve an overall reduction of polluting emissions.

In this description, the term "diesel engines" is meant to include those engines capable of being run on "diesel fuel", as defined by the American Society of Testing and Management (ASTM) Standard Specification for Fuel Oils (designation D 396-86) or any of grade numbers 1-D, 2-D or 4-D, as specified in ASTM D 975. More generally, diesel fuel can be a fuel oil No. 2 or No. 4 petroleum distillates as well as alternative diesel fuels containing emulsified water or alcohols such as ethanol or methanol, very low sulfur fuels (less than 0.05% sulfur), diesel fuel blends with bioderived components (animal and vegetable fats and oils, fractions and derivatives), and the like, as long as they exhibit volatility and cetane number characteristics effective for the purpose. Diesel fuels will typically have a 90% distillation point within the range of 300° to 390° C. and a viscosity of from 1 to 25 centistokes at 40° C.

The invention concerns diesel engines equipped with or having associated therewith a diesel engine particulate trap. By this it is meant that a diesel engine particulate trap is disposed such that the exhaust stream from the engine passes therethrough. Generally, a diesel engine particulate trap (also referred to herein as a "diesel trap") is disposed in the exhaust system, typically on the tailpipe of the vehicle in which the diesel engine is located, downstream from the exhaust manifold. While generally known to those skilled in the art, reference to FIG. 1 may help further illustrate a representative configuration.

Suitable diesel traps are known to the skilled worker and generally comprise an apparatus designed to trap or collect particulates which are present in the exhaust stream of the diesel engine. Such a trap can be made of any suitable material such as ceramic (for instance, a cordierite ceramic material), glass fiber, or metal. In addition, the trap can be coated with a catalytic material to facilitate regeneration. It is an advantage of the present invention that the traps are selectively catalyzed during operation.

Flow resistance to the exhaust increases in proportion to the efficiency of the diesel trap at collecting particulates, and a compromise must be made between trap efficiency and exhaust back pressure. One type of diesel engine particulate trap which is found to be effective at trapping particulates while still providing an acceptable compromise in terms of back pressure created are traps available under the trademarks Diesel filter or EX 51 100/17 from Corning Glass Corporation of Corning, N.Y.

Suitable diesel engine particulate traps are typically constructed of a gas permeable material, such as a ceramic. Traps can be configured to include at least two (and generally several) parallel gas channels longitudinally arranged in a honeycomb-type structure extending between what can be referred to as an upstream, or engine-side, face and a downstream, or exhaust-side, face. Each passage is plugged at one of its faces such that alternate faces of adjacent passages are plugged. In this way, exhaust entering the trap through a passage at its unplugged upstream face must pass through a wall into an adjacent passage in order to exit the trap from its unplugged downstream face. Particulates in the exhaust are then trapped or collected on the wall. Such a trap is described, for instance, in U.S. Pat. No. 4,568,357 to Simon, the disclosure of which is incorporated herein by reference.

The particulate trap used in the methods of the invention can be one which is self regenerating, that is, trapped particulates are ignited by heat derived from the engine, usually from the hot exhaust gasses themselves. In order to reduce particulate buildup on the trap, it is desired that the particulates are combusted or "burned off" the trap in order to free the surface thereof for further collection of particulates. Under normal conditions, and without the use of a catalyst, temperatures of from over about 500° C. up to about 600° C., and sometimes more, are required to combust the particulates and, thus, regenerate the trap. Since a four stroke diesel engine produces exhaust gases which are typically exhausted at an average temperature of between about 400° C. and 500° C., and which only occasionally reach temperatures in excess of 600° C., the exhaust gas temperature is too low to lead to reliable trap regeneration. A two-stroke diesel engine produces exhaust gases at an even lower temperature, which rarely exceeds 600° C., making reliable trap regeneration even less likely.

The invention improves the operation of diesel engines equipped with traps, either catalyzed or uncatalyzed, and if catalyzed in any stage of activity. In each of the embodiments of the invention, the regeneration characteristics of the trap are improved by lowering the balance point of the trap. In other words, the invention lowers the temperature of the trap whereat a steady state is achieved and the rate of particulate deposit in the trap is the same as the rate of particulate burning in the trap. Thus, at the balance point (temperature), the trap is regenerated at the same rate that it is loaded. The balance point can be determined by plotting against temperature, the incremental change in temperature divided by the incremental change in pressure through the trap. The temperature at the point where the plotted line crosses the abscissa, can be taken as the balance point and is used to define that term for the purposes of this description.

The invention enables the balance point to be lowered sufficiently to permit reliable trap regeneration, and to do so with reductions in carbon monoxide and unburned hydrocarbons. The art has not previously been able to achieve such significant results in these apparently contradictory effects. It is an advantage that, in the preferred embodiment, no auxiliary heater is needed to achieve continuous regeneration during sustained operation of the diesel engine. It is also an advantage of the invention that the benefits achievable for the platinum group metals (including reductions in hydrocarbons, carbon monoxide, and trap balance point temperature) are not adversely affected by the presence of auxiliary catalysts, making it possible to obtain the positive benefits of both the platinum group metal catalyst and the auxiliary catalyst.

It is another advantage of the invention that the ability to lower the balance point offerred by the invention makes it possible to effectuate exhaust gas recirculation as known to the art for reducing $NO_x$, but without undue concern for an expected increase in particulates. According to one of the embodiments of the invention, diesel emissions of $NO_x$ and particulates are reduced simultaeously, and simultaneously with gaseous hydrocarbons and carbon monoxide, by the combined use of exhaust gas recirculation, a particulate trap, and a platinum group metal catalyst composition alone or in combination with an auxiliary catalyst. FIG. 1 is provided to illustrate this embodiment wherein the catalyst compositions are added to the diesel fuel.

It is another advantage of the invention that the ability to lower the balance point offered by the invention makes it possible to effectuate $NO_x$ reduction by retarding injection of diesel fuel and reduce the combustion temperature, but without undue concern for an expected increase in particulates. According to one of the embodiments of the invention, diesel emissions of $NO_x$ and particulates are reduced simultaneously, and simultaneously with gaseous hydrocarbons and carbon monoxide, by the combined use of retarding engine timing, a particulate trap, and a platinum group metal catalyst composition alone or in combination with an auxiliary catalyst.

It has been further recognized that the advantages noted for the platinum group metal catalysts can be further improved by using an auxiliary catalyst metal. This forms the basis of another embodiment wherein, a multi-metal catalyst composition, comprising a combination of a platinum metal catalyst composition and at least one auxiliary catalyst metal, can be added to the diesel fuel prior to combustion to provide catalyst metal to the exhaust system including a diesel trap to lower the balance point of the particulate trap while also lowering the emissions of carbon monoxide and unburned hydrocarbons. One or both of the catalyst metal compositions can alternatively introduced into the combustion air or exhaust at any point effective to provide active metal catalysts in the trap. These improved results are achieved while, preferably, selectively maintaining a low oxidation of $SO_2$ to $SO_3$.

Platinum group metals include platinum, palladium, rhodium, ruthenium, osmium, and iridium. Compounds including platinum, palladium, and rhodium, especially compounds of platinum alone or in combination with rhodium and/or palladium compounds are preferred in the practice of this invention since the vapor pressure of these metals is sufficiently high to facilitate the desired reduction of carbon monoxide emissions.

The platinum group metal catalyst compositions can be of the type which are soluble in nonpolar hydrocarbon fuels, soluble in polar fuels such as those including methanol, ethanol, or other lower alkyl alcohols, or soluble in fuels having polar and nonpolar components such as emulsified fuels and gasohol. The platinum group metal catalyst compositions can be formulated according to the teachings below or as known to the art generally, to have the degree of stability necessary to assure that the platinum group metal catalyst composition is subjected to the heat of combustion in the combustion chamber within a cylinder of a diesel engine to release the platinum group metal catalyst into the exhaust gases which transport it to the exhaust system wherein it is deposited in the trap along with the particulates and any auxiliary catalyst metal.

The platinum group metal catalyst compositions can be fuel-soluble, fuel-soluble but water-sensitive, or water-soluble, as will be described below. The platinum group metal catalyst compositions are typically added in amounts effective to provide concentrations of the platinum group metal relative to the fuel of less than 1 part per million (ppm). When employed, the auxiliary catalytic metal compositions are preferably used in amounts to provide concentrations of from about 1 to about 100 ppm of the metal.

Simultaneous Reduction of $NO_x$ and Particulates

In one particularly preferred embodiment, the combination of a particulate trap and a fuel additive comprising at least a platinum group metal composition in catalytic amounts (preferably also with auxiliary catalyst metal compositions) is employed along with a technique to control $NO_x$ emissions, such as exhaust gas recirculation or retarding engine timing. In this manner, the combined emissions of HC, CO, $NO_x$ and particulates are reduced from what is possible with current technology.

Reference is made to FIG. 1 which illustrates in schematic form the process of exhaust gas recirculation as improved by the invention, such that a significant improvement is made on the overall diesel emission problems—reducing $NO_x$, carbon monoxide, gaseous unburned hydrocarbons, and particulates. FIG. 1 shows a diesel engine 10 having an exhaust manifold 20 directing the exhaust from the engine to an exhaust system including a diesel trap 30. The diesel engine is supplied with fuel from tank 40 via line 42 and fuel injectors 44', 44", 44''', and 44''''. The fuel tank includes diesel fuel including a platinum group metal catalyst composition, although this composition could be supplied from a separate canister fitted to the fuel line or from a suitable metering pump. It can also be supplied in the form of an aerosol into either the intake air in line 24, the exhaust manifold 20, a exhaust line leading to the trap, or recycle line 22.

FIG. 1 shows line 22 connected to exhaust line 32 to divert a portion of the exhaust gases from line 32 and recirculates it to chamber 26 for mixing with combustion air fed to the combustion chambers of the cylinders of the engine 10. The portion of exhaust gases separated from manifold exhaust line 32 can be mixed with incoming air by suitable means (not shown) such as described by Showalter in U.S. Pat. No. 4,609,342, or the like.

The process of this embodiment requires the provision of a diesel fuel, such as in tank 40, comprising a platinum group metal catalyst composition. Consistent with the other embodiment of the invention, it can also include an auxiliary catalyst metal as will be described in detail below. A portion of the exhaust gases from a previous combustion cycle of the engine are diverted from exhaust line 32 by line 22 and mixed with incoming combustion air from line 24. The combustion air and the separated exhaust gases are thoroughly mixed. The resulting combustion air mixture is introduced into the cylinders of the diesel engine and distributed such as at port 28 (the other cylinders are illustrated with similar, but unnumbered ports). The combustion air mixture is compressed in nomal fashion for a diesel engine within each cylinder. The diesel fuel (preferably catalyzed as described) is then injected into the cylinders. The fuel is then combusted with the combustion air mixture (typically at an excess oxygen content of from about 2 to about 15%) to produce exhaust gases including platinum group metal (and any auxiliary catalyst metal, if employed).

The cycle just described is then repeated as the engine continues to run, to lower the combustion temperature and reduce the amount of $NO_x$ produced. While the amount of particulates produced in the engine is increased somewhat by the procedure of exhaust gas recirculation, it is an advantage of the invention makes that the use of this technique is made more practical than before because the particulates are caught in the diesel trap and burned off with less buildup of back pressure and less emission of carbon monoxide and unburned hydrocarbons. Another advantage of the preferred embodiment as illustrated in FIG. 1, is that less particulates are recirculated back to the engine where they could cause combustion or mechanical problems. The amount of exhaust gases recirculated to chamber 26 for forming the combustion air will be effective to lower the production of $NO_x$ by the engine utilizing the combustion air mixture as compared to combustion air not containing exhaust gases. Typically, from about 1 to about 20% can be efficiently recirculated.

The platinum group metal catalyst is preferably present in the diesel fuel in an amount effective upon combustion of the diesel fuel to provide sufficient platinum group metal in the exhaust system to lower the emissions of unburned hydrocarbons and carbon monoxide. This will be less than about 1 ppm, based on the weight of the catalyst metal, and will preferably be within the range of from about 0.05 to about 0.5 ppm, and most preferably in the range of from 0.10 to 0.30 ppm.

In another aspect of the invention, the injection timing of a diesel engine is set (for instance retarded or set during manufacture of the engine) in a manner designed to reduce the nitrogen oxides emissions from the engine after combustion of a diesel fuel.

It is believed that the closer to top dead center (i.e., point of greatest pressure in the cylinder during the combustion process) at which the timing is set, the greater the reduction of $NO_x$ emissions achieved. However, the injection timing should be set at that level sufficient to reduce nitrogen oxides levels to those desired generally according to either preset arbitrary limits or those required by various regulatory authorities. For instance, in some jurisdictions, it is required that diesel engines (notably new engines) emit no more than 4 grams per brake horsepower-hour (gm/BHP-hr) of nitrogen oxides. Although not always possible, reduction of $NO_x$ levels to no greater than about 4 gm/BHP-hr is, therefore, desired.

Preferably, injection timing can be retarded by between about 0.5° and about 80 to secure the advantages of the present invention. More particularly, the engine timing can be retarded between about 2° and about 6° in order to achieve satisfactory reductions in nitrogen oxides levels without compromising fuel consumption or CO or unburned hydrocarbon emissions to a level beyond that for which at least partial compensation is possible. If, for example, the injection timing is initially set at 18° before top dead center, practice of this invention dictates that it is preferably retarded, by which is meant injection occurs closer in time to top dead center, to about 17.5° to about 10°, more preferably about 16° to about 12°, before top dead center.

The injection timing can be set by retarding the timing of the engine during maintenance or at any other time when access to the engine is possible. In the alternative, the injection timing can be set by having it initially set at the desired level during manufacture or otherwise prior to placing the engine into operation.

It has been determined that the use of the platinum group metal additives not previously disclosed for this purpose in U.S. Pat. No. 5,266,083 can be used alone, or in combination with an auxiliary catalyst such as a compound of copper, cerium or the others listed herein without diminishing the results attributable to either. It has also been determined that the benefits of $NO_x$ reduction, at the same time as the achievement of reductions of hydrocarbons and carbon monoxide, through the use of the catalysts and procedures identified in U.S. Pat. No. 5,266,083, are not diminished when an auxiliary catalyst—such as copper, cerium or any of those mentioned below—is employed to achieve its results. Thus, two or more catalysts can be used without adversely affecting the results of the other—achieving the good results of each. Operating in this manner will substantially overcome the disadvantages of retarding injection timing to achieve $NO_x$ reductions.

Viewing the benefits of the invention from yet another perspective, the use of the noted additives can increase fuel efficiency (i.e., reduce fuel consumption) to levels observed before the retarding of the injection timing to achieve $NO_x$ reductions. This can be achieved by this invention (using catalysts and a trap) while reducing emissions of carbon monoxide and unburned hydrocarbons, which are often increased by adding traps.

In order to achieve further reductions in emissions of carbon monoxide and unburned hydrocarbons, a suitable oxidizer (either precatalyzed or catalyzed by the operation of the invention), such as a matrix of extrudate or pellets of alumina or other refractory oxide, or a monolith having a surface of a refractory oxide or a metal matrix, can also be utilized. In this way, significant reductions in nitrogen oxides are obtained without the art-accepted tradeoffs associated therewith.

In this aspect of the invention, a diesel engine is provided having a diesel engine particulate trap disposed such that the exhaust stream from the engine passes therethrough. Again here, the diesel engine particulate trap is disposed downstream from the exhaust manifold.

Even when not sufficiently efficient to offset entirely the increase in particulates observed when injection timing is retarded, a diesel trap can help to at least partially eliminate the particulates generated by retarding the injection timing. Moreover, the additive can also decrease the ignition temperature of particulates collected on the trap. This can facilitate regeneration of the trap for greater efficiency. It is an advantage of the invention that the benefits achievable for the platinum group metals (including reductions in hydrocarbons, carbon monoxide, and trap balance point temperature) are not adversely affected by the presence of auxiliary catalysts, making it possible to obtain the positive benefits of both the platinum metal catalyst and the auxiliary catalyst.

Fuel-Soluble Platinum Group Metal Catalyst Compositions

Preferred among the platinum group metal catalyst compositions are those which are soluble in the typical diesel fuel which is essentially a nonpolar hydrocarbon fuel, but can contain tramp moisture in amounts which would destabilize some fuel-soluble platinum group metal compositions. Among these are hydrocarbon-fuel-soluble organometallic platinum group metal coordination compounds. The compounds in this group are any of those disclosed for example in prior U.S. Pat. Nos. 4,892,562 and 4,891,050 to Bowers and Sprague, 5,034,020 to Epperly and Sprague, 5,215,652 to Epperly, Sprague, Kelso and Bowers, and 5,266,083 to Peter-Hoblyn, Epperly, Kelso and Sprague, and WO 90/07561 to Epperly, Sprague, Kelso and Bowers. Reference can be made to these disclosures for details of preparation and purification. Where the application permits, a blend of these compounds can be used with one or more other platinum group metal compounds such as soaps, acetyl acetonates, alcoholates, β-diketonates, and sulfonates, e.g., of the type which will be described in more detail below. Preferably, the composition will be temperature stable, and substantially free of phosphorus, arsenic, antimony, or halides.

Advantageously, in fuels or systems where some tramp water may be present, the platinum group metal catalyst composition will also be substantially insensitive to water, as evidenced by a partition ratio sufficient to maintain significant preferential solubility in the fuel. The relative solubility of the composition in the diesel fuel and water is important since there is often a substantial amount of water admixed in with fuel, and any platinum group metal catalyst composition which separates from the fuel can precipitate out or be lost as a coating on fuel system walls. The relative solubility of the composition in the fuel is referred to herein as the "partition ratio" and can be expressed as the ratio of the amount in milligrams per liter of composition which is present in the fuel to the amount which is present in the water. This can most easily be determined in a 100 milliliter (ml) sample which is 90% fuel and 10% water. By determining the amount of composition in the fuel and the amount in the water, the partition ratio can be readily determined.

The organic nature of the platinum group metal compositions of this type provides solubility in nonpolar hydrocarbon fuels such as diesel fuel, thereby facilitating the introduction of the composition into the combustion chamber of an internal combustion engine. High fuel solubility maintains the platinum in the fuel and inhibits its precipitation or plating out in the fuel tank or fuel lines prior to introduction into the combustion chamber. In uses where the composition is intended for long-term storage either in an additve formulation or in the final fuel, high fuel solubility and stability in solution are important. In uses where the composition as part of an additive is mixed with the fuel shortly before introduction into the engine, lesser stabilities can be effective.

Temperature stability of the composition is important in many practical and operational contexts. In a commercial setting, a fuel additive is often packaged and stored in a building or in a delivery truck for extended periods of time during which the additive can be exposed to temperature variations and extremes. If the breakdown temperature of the composition is not sufficiently high (i.e., if the composition is not temperature stable at the temperatures to which it is expected to be exposed), then the packaged composition as part of an additive will quickly break down and become virtually useless.

Moreover, breakdown of the composition after mixing with the fuel will render the composition insoluble in the fuel, since the solubility is provided by the organic functional groups. Such loss of solubility will cause the composition to precipitate and not reach the combustion chamber, as discussed above. This becomes important when the additive is mixed into the fuel in advance of the fuel being provided to the fuel system of the engine (as opposed to a separate additive reservoir on the vehicle, with mixing occurring immediately prior to combustion), as desired.

Typically, the breakdown temperature of the platinum group metal catalyst composition should be at least about 40° C., preferably at least about 50° C., in order to protect against most temperatures to which it can be expected to be exposed. In some circumstances, it will be necessary that the breakdown temperature be no lower than about 75° C.

The organic nature of the preferred platinum group metal catalyst compositions helps to maintain them in solution in an organic solvent which provides a convenient diluent and can have functional properties, thereby preventing "plating out" of the platinum group metal catalyst composition in the packaging medium.

The platinum group metal catalyst composition should be substantially free from objectionable amounts (in some cases, traces) of compounds or functional groups containing, phosphorus, arsenic, antimony, and, especially, halogens (i.e., they should not contain a substantial amount of such functional groups) which have significant disadvantages like "poisoning" or otherwise reducing the effectiveness of the platinum group metal catalyst composition or any auxiliary catalyst metal composition employed. Halogens can have the additional undesirable effect of rendering a platinum group metal more volatile, leading to its release from the exhaust system.

A substantial amount of such functional groups is considered an amount effective to significantly reduces the effectiveness of the catalyst. Preferably, the purified platinum group metal catalyst composition contains no more than about 300 ppm of halogen nor more than 500 ppm (on a weight per weight basis) of phosphorus, arsenic, or antimony, more preferably no more than about 250 ppm of any of these. Most preferably, the additive contains no phosphorus, arsenic, or antimony.

Such objectionable functional groups can be minimized in several ways. The platinum group metal catalyst composition can be prepared in a process which utilizes precursors or reactant compositions having a minimum of such functional groups; or the composition can be purified after preparation. Many such methods of purification are known to the skilled worker.

One preferred method of preparing and purifying the fuel-soluble platinum group metal catalyst compositions is set forth in U.S. Pat. No. 5,215,652, the disclosure of which is incorporated herein by reference.

The preferential solubility of the composition in fuel as compared to water can be critical because if a substantial amount of the composition is dissolved in the water which may be present, the overall effectiveness of the composition is proportionally reduced. This partition ratio should be at least about 25 and is most preferably greater than about 50.

In order to reduce the water susceptibility of the platinum group metal catalyst composition, it is especially desired that the composition have at least one platinum group metal-to-carbon covalent bond. A platinum group metal-to-oxygen or platinum group metal-to-nitrogen bond can be acceptable, but there must also be at least one metal to carbon bond.

The preferred class of fuel soluble catalyst compositions, shown by formula (A) below, includes compounds where the platinum group metal exists in oxidation states II and IV. Compounds in the lower (II) state of oxidation are preferred due to their function in generating the catalytic effect, preferably having at least one coordination site occupied by a functional group containing an unsaturated carbon-to-carbon bond. Most preferably, two or more of the coordination sites will be occupied by such functional groups since the stability and solubility in diesel fuel of compounds having such multiple functional groups are improved.

Occupation of one of more coordination sites with the following unsaturated functional groups has been found useful:

1. Benzene and analogous aromatic compounds such as anthracene and naphthalene.

2. Cyclic dienes and homologues such as cylooctadiene, methyl cyclopentadiene, and cyclohexadiene.

3. Olefins such as nonene, dodecene, and polyisobutenes.

4. Acetylenes such as nonyne and dodecyne.

These unsaturated functional groups, in turn, can be substituted with nonhalogen-substituents such as alkyl, carboxyl, amino, nitro, hydroxyl, and alkoxyl groups. Other coordination sites can be directly occupied by such groups.

A preferred group of compositions is represented by the following general formula (A) L$^1$MR$^1$ R$^2$ 

wherein L$^1$ is either a single cyclic polyolefin or nitrogenous bidentate ligand or a pair of nitrogenous or acetylenic monodentate ligands, preferably cyclooctadienyl; M is a platinum group metal, especially platinum itself; and R$^1$ and R$^2$ are each, independently, substituted or unsubstituted lower alkyl (e.g., 1–5 carbons) benzyl, nitrobenzyl, aryl, cyclopentadiene or pentamethyl cyclopentadiene, preferably benzyl, methyl and/or phenyl.

Exemplary of compounds are dipyridine platinum dibenzyl; bipyridine platinum dibenzyl; dipyridine palladium diethyl; cyclooctadiene platinum dimethyl; cyclooctadiene platinum diphenyl; cyclooctadiene platinum dibenzyl; cyclooctadiene platinum dinitrobenzyl; cyclooctadiene platinum methyl cyclopentadiene; norbornadiene platinum di-cyclopentadiene; dimethyl platinum cyclooctatetrene (which often assumes the formula dimethyl platinum cyclooctatetrene platinum dimethyl); and cyclooctadiene osmium bis (cyclopentadiene).

One group of compounds meeting the above general formula for the preferred coordination II compounds is defined as follows:

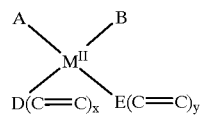

(A.1.)

where M$^{II}$ represents the platinum group metal, with a valence of +2, where A, B, D, and E are groups such as alkyl, alkoxy, carboxyl, etc. described above specifically or functionally as providing stability and fuel solubility, where (C=C)$_x$ and (C=C)$_y$ represent unsaturated functional groups coordinated with the platinum group metal, and where x and y are any integer, typically 1 to 5.

The most preferred platinum group coordination compounds according to the above general formula are those represented by the following formula:

(A.2.) X M$^{II}$R$_2$ 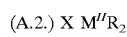

wherein X is a cyclooctadienyl ligand, M is a platinum group metal, and R is methyl, benzyl, phenyl, or nitrobenzyl. The R group can be any organic group which provides the requisite stability and can be substituted consistently with this objective.

Among other platinum group metal compounds, are the following (B) 2,2'-bis(N,N-dialkylamino)1,1'-diphenyl metals, such as represented by the formula

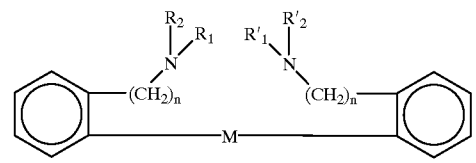

wherein M is a platinum group metal; R. and R$_2$ are lower alkyl, e.g., from 1 to 10 carbons; and each n is, independently, an integer from 1 to 5. Representative of this group is 2,2'-bis(N,N-dimethylamino)1,1'-diphenyl palladium.

(C) tetrakis (alkoxy carbonyl) metal cycloalkenes, as represented by the formula M(C$_4$COOR$_1$)$_4$R$_2$ 

wherein M is a platinum group metal; R$_1$ is a lower alkyl, e.g., from 1 to 5 carbons, and R$_2$ is a cycloalkene having, e.g., from 5 to 8 carbons and from 2 to four unsaturations within the ring structure. Representative of this group is tetrakis (methoxy carbonyl) palladia cyclopentadiene.

(D) μ-diphenyl acetylene bis (η$^5$pentaphenyl cyclopentadiene) di metals as represented by the formula (φC Cφ) (C$_5$M)$_2$ 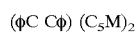

wherein M is a platinum group metal and φ is phenyl. Representative of this group is μ-diphenyl acetylene bis (η$^5$-pentaphenyl cyclopentadiene) dipalladium.

(E) dialkyl dipyridyl metals of the formula $$\begin{array}{c} R^1 \\ \phantom{R^1}\diagdown \\ \phantom{R^1R^2}M(C_{10}H_8N_2) \\ \phantom{R^1}\diagup \\ R^2 \end{array}$$

wherein M is a platinum group metal; and $R_1$ and $R_2$ are lower alkyl, e.g., having from 1 to 5 carbons. Representative of this group is diethyl dipyridyl palladium.

(F) bis (π-allyl) metals of the formula $$(R\text{—}C_3H_5)_2M$$

wherein M is a platinum group metal and R is hydrogen, aryl, or alkyl, e.g., one to ten carbons. Representative of this group is bis (phenyl allyl) palladium.

(G) compositions of the general formula $$L^2M^1R^3$$

wherein $L^2$ is either a single cyclic polyolefin or nitrogenous bidentate ligand or a pair of nitrogenous or acetylenic monodentate ligands; $M^1$ is a platinum group metal, especially rhodium or iridium; and $R^3$ is cyclopentadiene or pentamethyl cyclopentadiene. Exemplary of suitable compounds of the formula $L^2M^1R^3$ are cyclooctadiene rhodium cyclopentadiene; cyclooctadiene rhodium pentamethyl cyclopentadiene; norbornadiene rhodium pentamethyl cyclopentadiene; cyclooctadiene iridium cyclopentadiene; cyclooctadiene iridium pentamethyl cyclopentadiene; norbornadiene iridium cyclopentadiene; and norbornadiene iridium pentamethyl cyclopentadiene.

(H) compositions of the general formula $$L^3M^2(C_4R^4_4)$$

wherein $L^3$ is either a single cyclic polyolefin or nitrogenous bidentate ligand or a pair of nitrogenous monodentate ligands; $M^2$ is platinum, palladium, rhodium, or iridium; and $R^4$ is $COOR^5$, wherein $R^5$ is hydrogen or alkyl having from 1 to 10 carbons, preferably methyl. Exemplary compounds have the structure $$L^3\text{—}M^2 \begin{array}{c} \phantom{xx}R^4 \\ \phantom{x}| \\ C=C\text{—}R^4 \\ \phantom{x}\| \\ C=C\text{—}R^4 \\ \phantom{x}| \\ \phantom{xx}R^4 \end{array}$$

such as tetrakis (methoxy carbonyl) palladia cyclopentadiene (wherein $L^3$ is cyclopentadiene, $M^2$ is palladium, and $R^4$ is $COOH_3$).

(I) compositions of the general formula $$L^4M^3(COOR^6)_2$$

or a dimer thereof, wherein $L^4$ is a non-nitrogenous cyclic polyolefin ligand, preferably cyclooctadiene or pentamethyl cyclopentadiene; $M^3$ is platinum or iridium; and $R^6$ is benzyl, aryl, or alkyl, preferably having 4 or more carbons, most preferably phenyl. Exemplary of compounds having the general formula $L^4M^3(COOR^5)_2$ are cyclooctadiene platinum dibenzoate dimer; and pentamethyl cyclopentadiene iridium dibenzoate.

(J) compositions comprising a reaction product of $[L^5RhX]_2$ and $R^7MgX$ wherein $L^5$ is a non-nitrogenous cyclic polyolefin ligand, preferably cyclooctadiene or pentamethyl cyclopentadiene; $R^7$ is methyl, benzyl, aryl, cyclopentadiene or pentamethyl cyclopentadiene, preferably benzyl or phenyl, and X is a halide. Although presently uncharacterized, it is believed that this reaction product assumes the formula $L^5RhR^7$.

Functional groups which are especially preferred for use as ligands $L^1$ through $L^3$ are neutral bidentate ligands such as cyclopentadiene, cyclooctadiene, pentamethyl cyclopentadiene, cyclooctatetrene, norbornadiene, o-toluidine, o-phenantholine, and bipyridine. Most preferred among monodentate ligands is pyridine.

Also useful in the present invention are any of the following compositions.

(K) palladium acetylene complexes having the general formula wherein $R^8$ is aryl or alkyl; and $R^9$ is aryl, preferably phenyl.

(L) metal allyl complexes having the general formula $$M^4(C_3H_5)_n \text{ or}$$

$$M^4(C_3H_4\text{—}R^{10})_n$$

wherein $M^4$ is platinum group metal, especially rhodium or iridium; n is 2 for platinum and palladium, and 3 for rhodium, iridium, osmium and ruthenium; and $R^{10}$ is hydrogen, aryl, or alkyl. One compound of this type is bis (phenyl allyl) palladium.

(M) platinum (IV) compositions having the general formula $$R_3^{11}PtR^{12}$$

wherein $R^{11}$ is aryl, alkyl or mixtures thereof, such as cyclopentadiene or pentamethyl cyclopentadiene; and $R^{12}$ is hydroxyl (—OH), acetylacetonate (—$CH_2(COCH_3)_2$), cyclopentadiene or pentamethyl cyclopentadiene (exemplary of which is trimethyl platinum hydroxide).

(N) compositions of the general formula $$L^6M^5R^{13}$$

wherein $L^6$ is substituted or unsubstituted butadiene or cyclohexadiene; $M^5$ is rhodium or iridium; and $R^{13}$ is cyclopentadiene or pentamethyl cyclopentadiene (exemplary of which are butadiene rhodium cyclopentadiene and butadiene iridium cyclopentadiene.

Any of the above can be employed alone or in combination.

Water-Sensitive and Water-Soluble

Platinum Group Metal Catalyst Compositions

In addition to the highly fuel-soluble compounds that are stable in the presence of water, the invention makes use of platinum group metal catalyst compositions which would normally be taken up or destabilized by any water present.

These platinum group metal catalyst compositions can be either simply water-sensitive or essentially water-soluble. Water-sensitive platinum group metal catalyst compositions are characterized as being instable in the presence of from about 0.01 to about 0.5% water, but having sufficient affinity for the fuel that when a water-functional composition is employed, they remain in the fuel and effective for their intended catalytic function. Among the platinum group metal catalyst compositions in this group are, alcoholates, sufonates, substituted and unsubstituted beta-diketonates and soaps selected from the group consisting of stearates, palmitates, laurates, tallates, napthanates, other fatty acid soaps, and mixtures of two or more of these.

The water-sensitive compounds typically exhibit partition ratios of from about less than 50, down to about 1. Compositions of this type having partition ratios as low as 40 and below, e.g., less than 25, and more narrowly less than 1 to 20, can be effective according to the invention. Also, essentially water-soluble platinum group metal catalyst compositions having partition ratios of less than 1 can be employed according to the invention.

To achieve stability in the presence of water, the fuels are formulated to include a water-functional composition selected from the group consisting of lipophilic emulsifiers, lipophilic organic compounds in which water is miscible, and mixtures of these, which can be added to the fuel as an additive including any catalyst compositions, as a discrete additve or as part of the bulk fuel. The preferred compounds or compositions have the capability of preventing frank separation of water from the fuel and maintain it tied up in the fuel, preferably in complete miscibility with a nonpolar fuel component or in droplets no larger than about 2 $\mu$, and preferably smaller than about 1 $\mu$ in diameter, based on a weight average of droplet sizes. Discrete pockets or pools of water, where the uniform distribution of the platinum group metal catalyst composition within the fuel is disturbed, are preferably avoided.

In addition to the required components, it is preferred to employ a suitable hydrocarbon diluent such as any of the higher aliphatic alcohols (e.g., having over 3 carbons, i.e., from 3 to 22 carbons), tetrahydrofuran, methyl tertiarybutyl ether (MTBE), octyl nitrate, xylene, mineral spirits or kerosene, in an amount effective to provide a suitably pourable and dispersible mixture for additive compositions. Additionally, where the fuel contains a demulsifier, then an additional amount of emulsifier specifically intended to overcome the effects of such can be employed. Also, the use of additives known to the art as described above and in the references there cited, can be employed as the application calls for. Specifically, it is sometimes desirable to add one or more of corrosion inhibitors, cetane improvers, lubricity control agents, detergents, antigel compositions, and the like.

Consistent with the objective of controlling the tendency for water to render certain platinum group metal catalyst compositions inactive, there are instances where the overt addition of water can be beneficial. Overt addition of water, e.g., from about 1 to about 65%, can be accomplished without rendering the platinum group metal catalyst compositions inactive. This is a highly effective technique for reducing $NO_x$, as disclosed for example in U.S. patent application Ser. No. 08/114,206, filed Aug. 30, 1993, by J. M. Valentine.

For example, fuel mixtures can be prepared as emulsions of diesel fuel and water, as mentioned above, but preferably including from about 5 to about 45% (more narrowly, 10 to 30%) water, for the purpose of controlling the amount of $NO_x$ produced during combustion. These emulsions can include a platinum group metal catalyst composition in a relative amount effective to provide the metal at a concentration of from about 0.1 to about 1.0 ppm, to reduce the carbon monoxide and hydrocarbon emissions, and employing a lipophilic emulsifier at a ratio of from about 1:10,000 to about 1:500,000 (more narrowly, from about 1:50,000 to about 1:250,000) based on the weight of the platinum group metal.

Also, there are instances wherein the use of complex emulsions (typically including a continuous hydrocarbon phase having dispersed therein droplets of water, which in turn have droplets of a lipophilic fluid dispersed therein). In one exemplary formulation of such a complex emulsion, the droplets of lipophilic fluid as the internally-dispersed phase can comprise the fuel additive, including the platinum group metal and the water-functional composition, e.g., a suitable emulsifier having the capability to maintain an emulsion of this type.

The emulsifiers effective for the complex emulsions will preferably contain a hydrophilic emulsifier such as higher ethoxylated nonyl phenols, salts of alkyl and alkyl ether sulfates, ethoxylated nonyl phenols with higher degrees of ethoxylation, higher polyethylene glycol mono- and di-esters, and higher ethoxylated sorbitan esters (e.g., higher in these contexts means from a lower level of 4–6 to about 10 or more). A fuel additive for use in preparing the complex emulsion preferably comprises a continuous hydrocarbon phase including a hydrophilic emulsifier at a concentration of from about 0.1 to about 10%, and a dispersed phase comprised of aqueous droplets having a platinum group metal catalyst composition dissolved or dispersed therein and a lipophilic emulsifier at a concentration of from about 0.1% to about 10% based on the weight of platinum group metal in the additive composition, said lipophilic emulsifier being charaterized by oil solubility and water dispersibility.

To better understand the above concept, the following exemplary procedure is presented: (1) The lipophilic emulsifier is added to the oil to be used for the internal phase at a ratio of from about 0.1 to about 10% of the total composition. Platinum group metal catalyst compositions may be dissolved or dispersed in this oil as desired. (2) The combined oil/lipophilic emulsifier just described is added to a solution of the hydrophilic emulsifier in water with stirring to form an oil-in-water emulsion. The concentration of hydrophilic emulsifier in the water is also between about 0.1 and 10% of the total composition. Water-soluble or dispersible platinum group metal catalyst compositions may be dispersed in the water as needed. (3) The oil-in-water emulsion described in step 2 is then added to oil containing the lipophilic emulsifier at a ratio of 0.1 to 10% of the total composition to form the final oil/water-in-oil emulsion.

Among the lipophilic emulsifiers suitable as the water-functional composition are, preferably, those emulsifiers having an HLB of less than about 10, and more preferably less than about 8. The term "HLB" means "hydrophile-lipophile balance" and is determined, as known from the procedure developed by ICI Americas, Inc. of Wilmington, Del., from a test of the relative solubility or dispersibility of the emulsifier in water, with nondispersible being 1–4 and fully dispersible being 13.

The emulsifier can be anionic, nonionic or cationic. Among the preferred anionic emulsifiers are sodium or TEA petroleum sulfonates, sodium dioctyl sulfosuccinates, and ammonium or sodium isostearoyl 2-lactylates. Among the preferred cationic emulsifiers are lower ethoxylated amines, oleyl imidazolines and other imidazoline derivatives. Among the preferred nonionic emulsifiers are alkanolamides including oleamide, oleamide DEA, and other similar compounds, lower ethoxylated alkyl phenols, fatty amine oxides, and lower ethoxylated sorbitan esters (e.g., lower in these contexts means from 1 to an upper level of from about 4–6). Functionally, materials meeting the following criteria can be effective individually and in combinations to stabilize the presence of water-senstive and water-soluble platinum group metal catalyst compositions in water-containing systems. Concentrations will be dependent on the exact formulation and the expected water content of the fuel, but concentrations of from about 0.01 to about 5%, based on the weight of the fuel as combusted, and assuming a water concentration of up to about 0.05%, are among those preferred. In some cases, it is more meaningful to express the concentration on the basis of the platinum group metal, and in this case it is preferably at a ratio of from about 10:1 to about 500,000:1 as compared to the weight of platinum group metal in the additive composition.

It is sometimes preferred to employ a combination of emulsifiers, because the various hydrocarbons in the fuels interact differently with the same emulsifier. Often, individual emulsifiers are less effective than combinations due to interactions, including those between the fuel and the emulsifier. One exemplary combination of emulsifiers, referred to herein also as an emulsification system, which can be utilized comprises about 25% to about 85% by weight of an amide, especially an alkanolamide or n-substituted alkyl amine; about 5% to about 25% by weight of a phenolic surfactant; and about 0% to about 40% by weight of a difunctional block polymer terminating in a primary hydroxyl group. More narrowly, the amide can comprise about 45% to about 65% of the emulsification system; the phenolic surfactant about, 5% to about 15%; and the difunctional block polymer, about 30% to about 40% of the emulsification system.

Suitable n-substituted alkyl amines and alkanolamides are those formed by the condensation of, respectively, an alkyl amine and an organic acid or a hydroxyalkyl amine and an organic acid, which is preferably of a length normally associated with fatty acids. They can be mono-, di-, or triethanolamines and include any one or more of the following: oleic diethanolamide (oleamide DEA), cocamide diethanolamine, lauramide DEA, polyoxyethylene (POE) cocamide, cocamide monoethanolamine (MEA), POE lauramide DEA, oleamide DEA, linoleamide DEA, stearamide MEA, and oleic triethanolamine, as well as mixtures thereof. Such alkanolamides are commercially available, including those under trade names such as Clindrol 100-0, from Clintwood Chemical Company of Chicago, Ill.; Schercomid ODA, from Scher Chemicals, Inc. of Clifton, N.J.; Schercomid SO-A, also from Scher Chemicals, Inc.; Mazamide®, and the Mazamide series from PPG-Mazer Products Corp. of Gurnee, Ill.; the Mackamide series from McIntyre Group, Inc. of University Park, Ill.; and the Witcamide series from Witco Chemical Co. of Houston, Tex.

The phenolic surfactant can be an ethoxylated alkyl phenol such as an ethoxylated nonylphenol or octylphenol. Especially preferred is ethylene oxide nonylphenol, which is available commercially under the tradename Triton N from Union Carbide Corporation of Danbury, Conn. and Igepal CO from Rhone-Poulenc Company of Wilmington, Del.

The block polymer which is an optional element of the emulsification system can comprise a nonionic, difunctional block polymer which terminates in a primary hydroxyl group and has a molecular weight ranging from about 1,000 to above about 15,000. Such polymers are generally considered to be polyoxyalkylene derivatives of propylene glycol and are commercially available under the tradename Pluronic from BASF-Wyandotte Company of Wyandotte, N.J. Preferred among these polymers are propylene oxide/ethylene oxide block polymers commercially available as Pluronic 17R1.

The emulsification system should be present at a level which will ensure effective emulsification of the water present, either alone or with a suitable lipophilic organic compound in which water is miscible (to be described in detail later). As an example, the emulsification system can be present at a level of at least about 0.05% by weight of the fuel to do so. Although there is no true upper limit to the amount of the emulsification system which is present, with higher levels leading to greater emulsification and for longer periods, there is generally no need for more than about 5.0% by weight, nor, in fact, more than about 3.0% by weight.

It is also possible to utilize a physical emulsion stabilizer in combination with the emulsification system noted above to maximize the stability of the emulsion. Use of physical stabilizers also provides economic benefits due to their relatively low cost. Although not wishing to be bound by any theory, it is believed that physical stabilizers increase emulsion stability by increasing the viscosity of immiscible phases such that separation of the oil/water interface is retarded. Exemplary of suitable physical stabilizers are waxes, cellulose products, and gums such as whalen gum and xanthan gum.

When utilizing both the emulsification system and physical emulsion stabilizers, the physical stabilizer is present in an amount of about 0.05% to about 5% by weight of the combination of chemical emulsifier and the physical stabilizer. The resulting combination emulsifier/stabilizer can then be used at the same levels noted above for the use of the emulsification system.

The emulsifiers are preferably blended with the platinum group metal catalyst composition and the resulting blend is then admixed with the fuel and emulsified. To achieve a stable emulsion, especially when large amounts of water are intended, a suitable mechanical emulsifying apparatus, such as an in-line emulsifying device, can be employed. Preferred emulsion stabilities will be for time periods of from about 10 days at a minimum to about 1 month or more. More preferably, the emulsion will be stable for at least 3 months.

Among the lipophilic organic compounds in which water is miscible, effective according to the invention, will be water-miscible, fuel-soluble compounds such as butanol, butyl cellosolve (ethyleneglycol monobutyl ether), dipropylene-glycol monometyl ether, 2-hexyl hexanol, diacetone alcohol, hexylene glycol, and diisobutyl ketone. Functionally, materials meeting the following criteria can be effective: that they have a water miscibility of at least about 10 g of water per liter of the material, and be soluble in the fuel (when the material contains the 10 g of water) in an amount of about at least 10 g per liter of total fuel. Additionally, the water functional composition will preferably be characterized by hydroxy, ketone, carboxylic acid funtional group, ether linkage, amine group, or other polar functional groups that can serve as water acceptors on a hydrocarbon chain. Concentrations will be dependent on the exact formulation and the expected water content of the fuel, but concentrations of from about 0.01 to about 1.0%, based on the weight of the fuel as combusted, are among those preferred. In some cases, it is more meaningful to express the concentration on the basis of the platinum group metal, and in this case it is preferably at a ratio of from about 1,000:1 to about 500,000:1 relative the weight of platinum group metal in the additive composition.

In addition to the materials described above and in U.S. Pat. No. 4,891,050 to Bowers, et al., U.S. Pat. No. 5,034,020 to Epperly, et al., and U.S. Pat. No. 5,266,093 to Peter-Hoblyn, et al., other platinum group metal catalyst compositions include commercially-available or easily-synthesized platinum group metal acetylacetonates, platinum group metal dibenzylidene acetonates, and fatty acid soaps of tetramine platinum metal complexes, e.g., tetramine platinum oleate. In addition, there are the water soluble platinum group metal salts such as chloroplatinic acid, sodium chloroplatinate, potassium chloroplatinate, iron chloroplatinate, magnesium chloroplatinate, manganese chloroplatinate, and cerium chloroplatinate, as well as any of those compounds identified or included within the description set forth by Haney and Sullivan in U.S. Pat. No. 4,629,472. The platinum group metal catalyst compositions are effective to release catalytic platinum group metal in the combustion chamber, or when added to the exhaust gases, release the catalytic platinum group metal there.

Auxiliary Catalyst Metal Composition

In the second embodiment, the platinum group metal catalyst compositions can be employed with other catalytic metallic compositions utilized for improving economy, reducing emissions of pollutants such as hydrocarbons and carbon monoxide, and for improving the operation of particulate traps or oxidation catalysts. Among the useful metallic compositions are organometallic salts of manganese, magnesium, calcium, iron, copper, cerium, sodium, lithium and potassium, which can be employed at suitable levels, e.g., from about 1 to about 100 ppm and preferably 20 to 60 ppm of the catalyst metal in combination with the platinum group metal catalyst in diesel fuels. Among these are the alcoholates, sufonates, beta-diketonates and soaps, e.g., selected from the group consisting of stearates, palmitates, laurates, tallates, napthanates, other fatty acid soaps, and mixtures of two or more of these, of copper, calcium, magnesium, manganese, iron, cerium, sodium, lithium and potassium compounds as are known as fuel soluble and useful fuel additives. Some, such as set forth in the above citations, are known as useful for reducing the temperature at which diesel traps can be regenerated. However, unlike the prior art, the invention permits them to achieve their known function while the emissions of hydrocarbons and carbon monoxide are reduced. Moreover, the invention reduces the balance point sufficiently low to permit $NO_x$ reduction by modifying engine timing or exhaust gas recirculation without the concern for increased particulates which would normally be associated with those techniques.

Among the lithium and sodium compounds are organometallic compounds and complexes as well as the salts of lithium and sodium respectively, with suitable organic compounds such as alcohols or acids, e.g., aliphatic, alicyclic and aromatic alcohols and acids. Exemplary of particular salts are the lithium and sodium salts of tertiary butyl alcohol and mixtures of these. Other lithium and sodium organic salts are available and suitable for use to the extent that they are fuel-soluble and are stable in solution. While not preferred, inorganic salts can also be employed to the extent that they can be efficiently dispersed in the fuel, such as in a stable emulsion or otherwise.

Among the specific sodium compounds are: the salts of sulfonated hydrocarbons, for example sodium petroleum sulfonate, available as Sodium Petronate from Witco Chemical ($NaO_3SR$, R=alkyl, aryl, arylalkyl, and R is a hydrocarbon having greater than three carbons); sodium alcoholates, for example sodium t-butoxide and other fuel- soluble alkoxides (NaOR, wherein R is an alkyl, e.g., from 3 to 22 or more carbons; and sodium napthenate (sodium salts of napthenic acids derived from coal tar and petroleum). Among the specific lithium compounds are the lithium analogs of the above sodium compounds.

Among the specific cerium compounds are: cerium III acetylacetonate, cerium III napthenate, and cerium octoate and other soaps such as stearate, neodecanoate, and octoate (2-ethylhexoate). Many of the cerium compounds are trivalent compounds meeting the formula: $Ce(OOCR)_3$, wherein R=hydrocarbon, preferably $C_2$ to $C_{22}$, and including aliphatic, alicyclic, aryl and alkylaryl.

Among the specific copper compounds are: copper acetylacetonate, copper napthenate, copper tallate, and copper soaps of $C_4$ to $C_{22}$ fatty acids, including stearate, laurate, palmitate, octoate, neodecanoate and mixtures of any of these. Fatty acids for these compounds can be derived from any animal or vegetable fat or oil, or fraction thereof, as well as from mineral oils. These copper compounds are divalent compounds, with the soaps meeting the formula: $Cu(OOCR)_2$. In addition, complexes formed by reacting or otherwise contacting copper compounds with various organic substrates to form a organometallic complexes as disclosed by patents such as U.S. Pat. No. 4,664,677, U.S. Pat. No. 5,279,627, U.S. Pat. No. 5,348,559, U.S. Pat. No. 5,360,549, U.S. Pat. No. 5,376,154, International Publication Number WO 92/20764, and the various references cited in them, can be employed.

Among the specific iron compounds are: ferrocene, ferric and ferrous acetyl-acetonates, iron soaps like octoate and stearate (commercially available as Fe(III) compounds, usually), iron pentacarbonyl $Fe(CO)_5$, iron napthenate, and iron tallate.

Among the specific managanese compounds are: methylcyclopentadienyl manganese tricarbonyl ($CH_3C_5H_4$ MN $(CO)_3$, as described for example in U.S. Pat. No. 4,191,536 to Niebylski; manganese acetylacetonate, II and III valent; soaps including neodecanoate, stearate, tallate, napthenate and octoate.

The calcium and magnesium compounds can have the same anions as the copper compounds, but will also include a wider range of sulfonates and overbased sulfonates.

The catalyst compositions are preferably included in a fuel additive composition which will preferably include a solvent which is soluble in the fuel. The fuel additive compositions may also contain other additives, such as detergents, antioxidants, and cetane improvers such as octyl nitrate which are known as beneficial to engine performance, but the use of such is not an essential feature of the invention.

The total amount of solvent and other additives used will depend on the dosage of platinum group metal catalyst composition required and on what is a convenient concentration to handle relative to the amount of fuel to be treated. Typically, solvent (plus other like additive) volumes of about 0.1 to about 40.0 liters/gram of platinum are acceptable.

Alternatively, the fuel additive composition can be provided at a ratio so as to provide a sufficient level of platinum group catalyst metal in a relatively short period of time, i.e., under about 10 hours, more preferably under about 5 hours. Effective levels to do so can range up to about 30 ppm, more advantageously, about 15 to about 25 ppm. These levels should be provided for about 0.5 to about 10 hours. Maintenance amounts to intermittently or continuously provide from about 0.1 to about 1.0 ppm can then be provided, to maintain superior activity.

In another alternative embodiment, an additive can be injected into the exhaust system, preferably just prior to the particulate trap, to supply catalyst on an initial or renewal basis either continuously or intermittently. In this embodiment, the additive can contain platinum group metal alone or in combination with an auxiliary catalyst metal. The concentration of catalyst for this use will depend on the dosage and the desired effect. In one embodiment the concentration can be sufficient to supply from 1 to 100 ppm for the platinum group metal and from 100 to 10,000 ppm for the auxiliary catalyst metals. The solvent or carrier should be rapidly volatilized and any organic component of the solvent or the catalyst compounds should be capable of burning off at the steady state exhaust temperature, e.g. in the range of 300° to 600° F. Exemplary solvents or carriers include water, alcohols, hydrocarbons, and other suitable organic liquids. The organic liquids can be of benefit in $NO_x$ reduction.

It has surprisingly been found that the use of the platinum group metal catalyst compositions reduces the usual conversion of $SO_2$ to $SO_3$ as compared to conventional platinum-catalyzed particulate traps which have the platinum metal applied. Although the reasons for this are not fully understood, it is believed that the platinum group metal catalyst functions in the trap to rapidly burn the carbon with a minimal requirement for oxygen to produce reducing conditions in the trap in so far as the oxidation of sulfur compounds is concerned. This selectivity, however, does not diminish the ability of the catalyst to reduce the emissions of carbon monoxide and unburned hydrocarbons on a steady basis.

It is an advantage of the invention that the use of the noted catalyst metals, when effective catalyst levels are built up, can reduce the balance point such that the particulates trapped in the particulate trap are removed at the same rate they are trapped whereby self-regeneration of the particulate trap, especially in a four-cycle diesel engine, may occur and at temperatures lower than would occur without use of the catalysts of the invention. Even if self-regeneration cannot completely occur, i.e., in a four-cycle engine which is not operating hot enough or in a two-cycle engine, the use of the described additives can reduce the temperature to which an auxiliary heat source is required to raise the diesel engine particulate trap, thereby increasing the efficiency of the use of the auxiliary heat source. In this way, further significant improvements in the use of a diesel engine particulate trap are obtained, without the art accepted tradeoff of substantially increased back pressure caused by clogging of the trap by collected particulates.

EXAMPLE 1

A series of tests was carried out to determine the effect of fuel soluble platinum fuel compositions on the emission of pollutants from a diesel engine operated with a particulate trap.

The engine specifications are as follows:

| | |
|---|---|
| Engine Type | Cummins LTA10-290-B |
| | Engine No. 23505691 |
| Peak Power (Measured) | 230 kW at 2100 rev/min |

-continued

| | |
|---|---|
| Peak Torque (Measured) | 1210 Nm at 1500 rev/min |
| Idle Speed | 625–725 rev/min |
| Bore | 125 mm |
| Stroke | 136 mm |
| Swept Volume | 10 liters |
| Compression Ratio | 16.0:1 |
| Fuel System | Cummins PT |

The engine was installed on a standard steady state test bed and coupled to a Schenck W400 dynamometer. Gaseous and particulate emissions measurements were made "before" and "after" the trap by using a bypass system. A noncatalyzed "Corning" wall flow trap measuring 11.25" by 12" was incorporated into the engine exhaust system, which also contained a pipe with a butterfly valve bypassing the trap. This allowed the exhaust to be directed either through the trap or through the bypass pipe with the trap sealed off. In the latter case the back pressure could be adjusted by means of the butterfly valve to equal the back pressure produced by the trap.

Fuel and oil with low halide contents were employed. The fuel used was Haltermann's 0.05% Sulfur 1994 specification fuel. The fuel halide content was 3 ppm. The oil used was Amoco Premier II SAE 15W-40, analyzed as containing 27.5 ppm Chloride. The platinum group metal catalyst composition had the following composition and was mixed with the fuel at a dosage rate of 1:2600 by volume (0.15 ppm, Pt):

| Component | Parts |
|---|---|
| Pt (II) Diphenyl Cyclooctadiene Cordination Compound | 0.0928 |
| Ethyl EDA-2 Detergent | 23.32 |
| Acetone | 2.4 |
| Toluene | 0.46 |
| K-1 kerosene | 73.73 |
| (Balance to 100.00) | |

For the comparative tests without the platinum, blank additive (identical except that there is no platinum component) was mixed at the same rate. The mixed fuel was supplied to the test cell in palletted containers with a continuous recirculation system to ensure the additive stayed thoroughly mixed. The engine test schedule was designed to provide baseline data, a period of conditioning with the additive and a repeat of tests after the conditioning:

Phase 1 was designed to give a reliable baseline on fuel doped with blank additive; and For Phase 2, the fuel was doped with platinum-based additive and 250 hours accumulated prior to repeating the baseline tests.

A duty cycle consisting of eight steps and six different conditions was designed to provide a mix of real-life operating conditions and to allow loading-up of the trap and regeneration. During the course of the duty cycle accumulation periods, measurements of temperatures, pressures, fuel consumption and gaseous emissions, were made at approximately ten-hourly intervals at three keypoints:

| | |
|---|---|
| I) Rated power | (2100 rev/min, 1065 Nm) |
| ii) Peak torque | (1500 rev/min, 1210 Nm) |
| iii) 80% Speed, 15% load | (1680 rev/min, 177 Nm) |

Five readings of fuel consumption were made to improve accuracy and allow statistical analysis of the results. The assessment tests consisted of three four-point load range curves conducted at peak torque speed (1500 rev/min) with full measurements of emissions and particulates. Each load range curve was conducted one with exhaust flowing through the bypass and once through the trap.

Particulate papers for one pair of load range curves (through the bypass and through the trap) were analyzed for unburned oil and fuel, carbon and soluble sulfate by solid injection GC, TGA and ion chromatography respectively.

The results of baseline performance tests with the trap indicate the key features of operation of the trap:

Particulate emissions reduced by 85–95%

HC is reduced 1044%

CO is increased by up to 60% at high load

The increase in CO appears to be a result of incomplete combustion of trapped carbon and HC at regeneration conditions, as observed in other programs.

The following effects were observed after 250 hours operation on fuel doped with platinum additive:

Little effect on Particulates and $NO_x$

HC is reduced by 34–87%

CO is reduced by up to 31–70%

Figure 2:
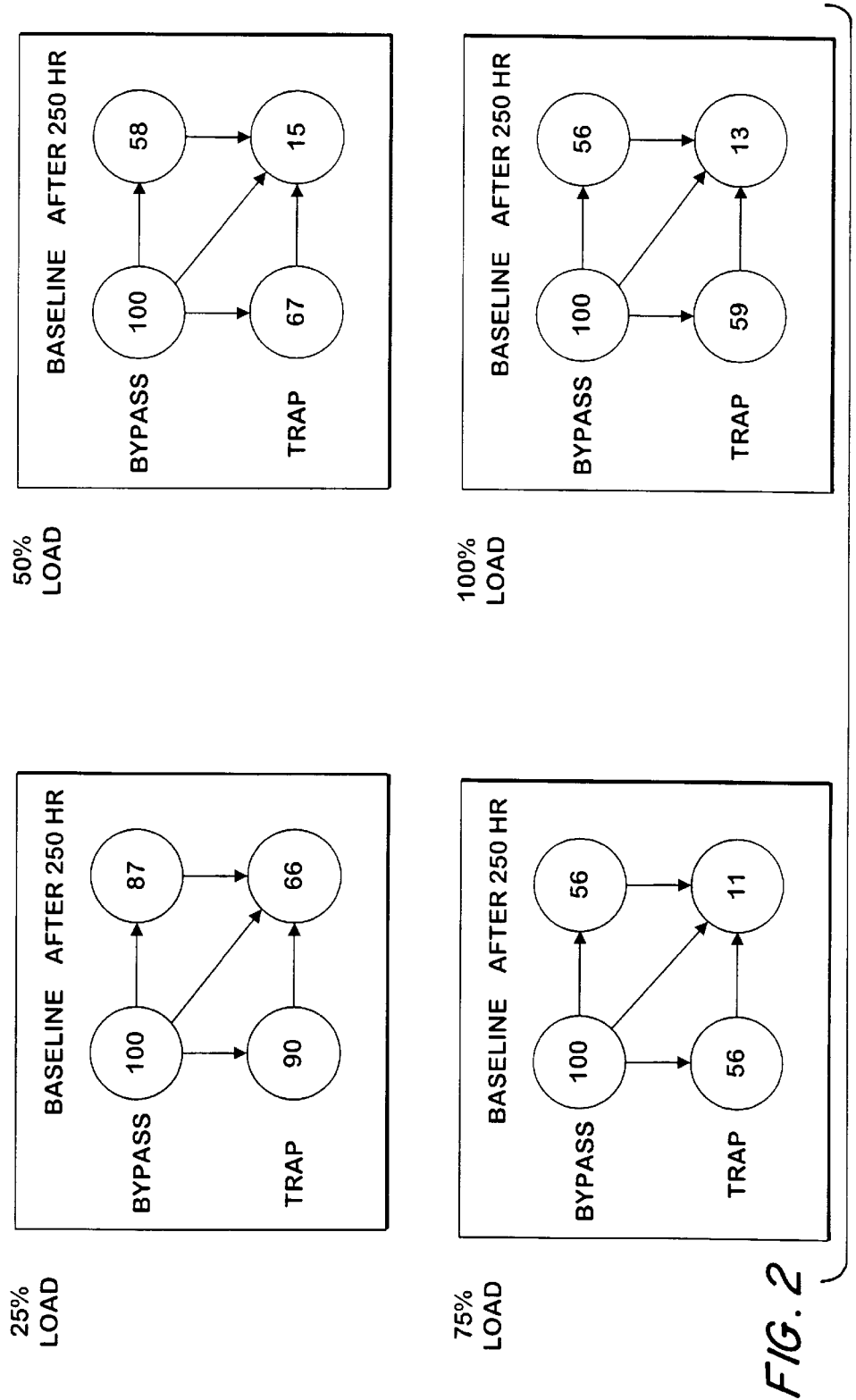
FIG. 2 is a chart which presents a summary of results from the tests of Example 1, comparing baseline and final results on carbon monoxide emissions both following a particulate trap and in an exhaust system which bypasses a trap.
Figure 3:
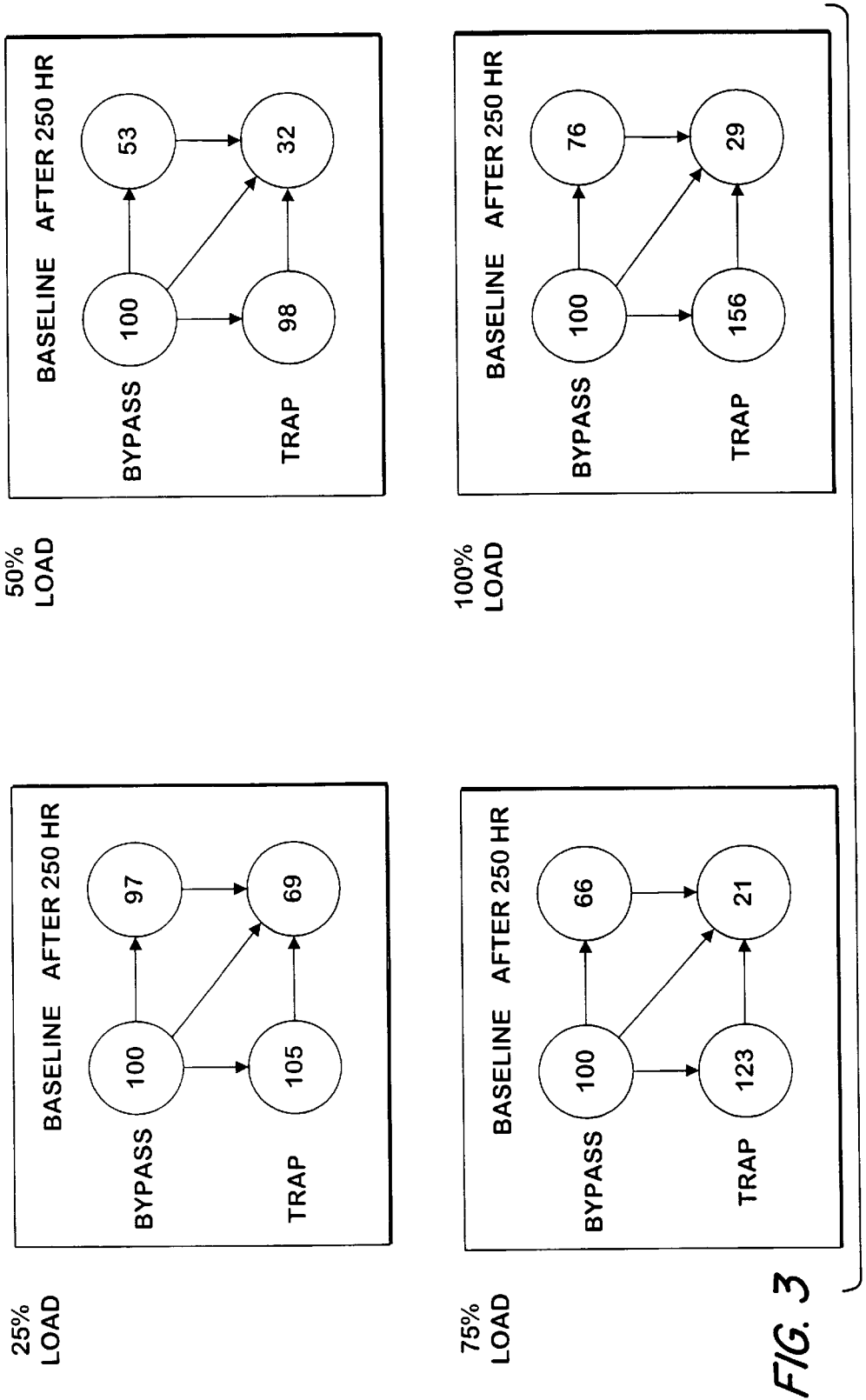
FIG. 3 is a chart, similar to that of FIG. 2, but showing the results for hydrocarbon emissions.
Figure 4:
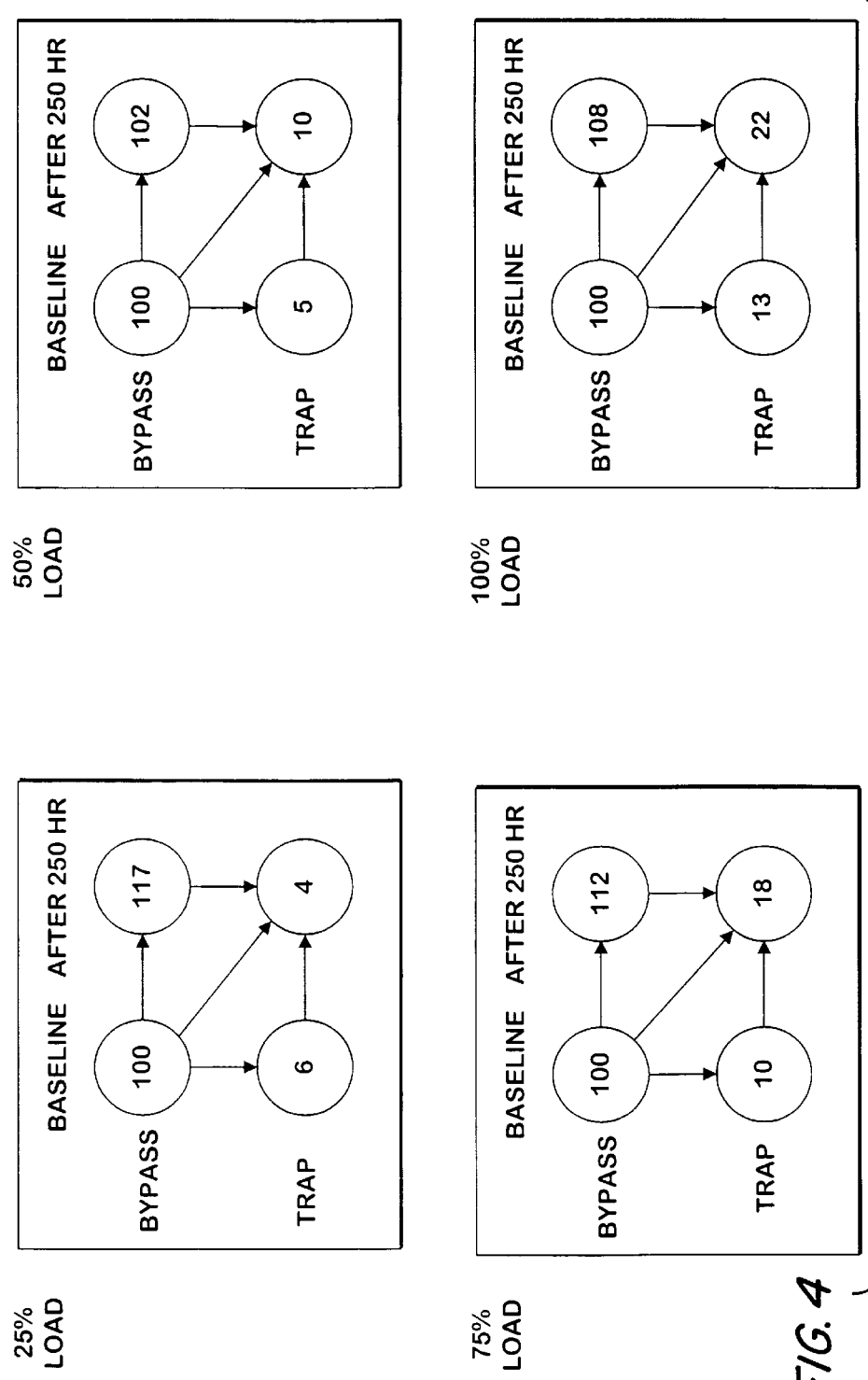
FIG. 4 is a chart, similar to that of FIG. 2, but summarizing the results for particulate emissions.

The principal effects of using platinum additive and a trap are summarized in FIGS. 2–4 which show, for particulates, HC and CO, the effect of using the trap and the additive starting from baseline engine emissions normalized to 100%. These figures show two steps of emissions reduction; adding platinum additive and adding the trap.

Relative to the average baseline emissions:

Using the platinum additive only
Reduces HC and CO by about 35%
Has little effect on Particulates Using the platinum additive in combination with a trap
Reduces HC and CO by about 75%
Reduces Particulate emissions by over 85%

Compared with other catalyst systems, the platinum additive and trap combination is able to achieve large HC and CO emissions without causing significant particulate increases from sulfate generation, even at high loads and temperatures. A possible explanation is that the platinum additive effectively creates and continually renews a very large lightly loaded catalyst in the engine, exhaust and trap. The equivalent may be difficult to achieve by conventional means due to space limitations, problems with long-term stability with very low platinum loadings, and masking of the catalyst material by carbon deposits. The addition of platinum additive will provide catalyst type benefits from reducing odor, etc., without any penalties from sulphate generation.

EXAMPLE 2

The additive used in combination with a trap as described above has been compared with uncatalyzed fuels, both through-flow catalysts and catalyzed trap systems.

The objective of through-flow catalysts on diesel engines is to reduce carbon monoxide, hydrocarbon emissions and burn the soluble organic fraction of particulates, preferably without forming sulfates from the sulfur in the fuel. The benefits of through-flow catalyst are the reduction of heavy hydrocarbons (fuel and oil) in the particulate. There is also a benefit from the reduction of gaseous hydrocarbons by the reduction of odor, etc.

Figure 5:
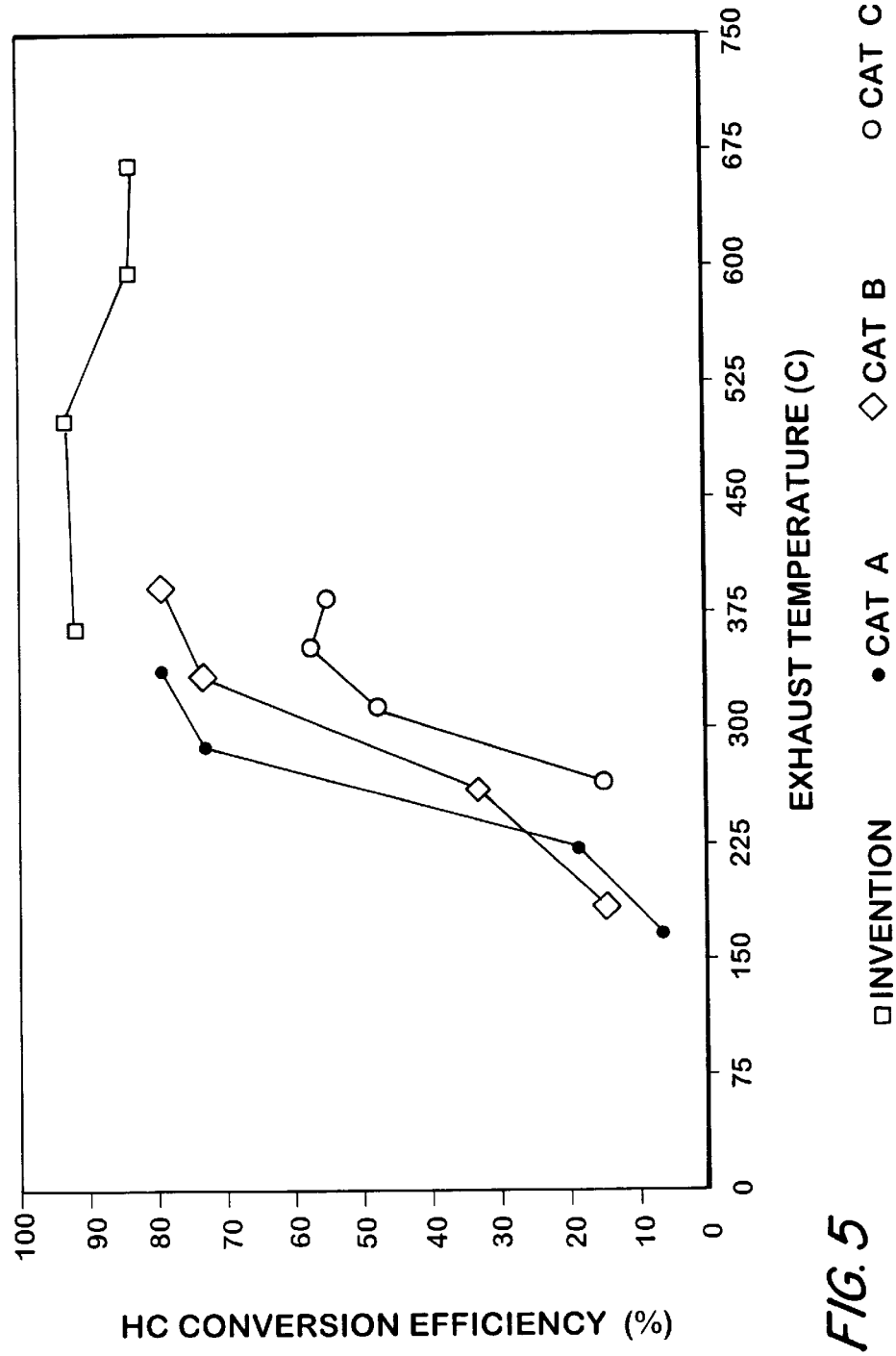
FIG. 5 is a graph showing the efficiency of hydrocarbon conversion for the present invention as compared to other test systems.
Figure 6:
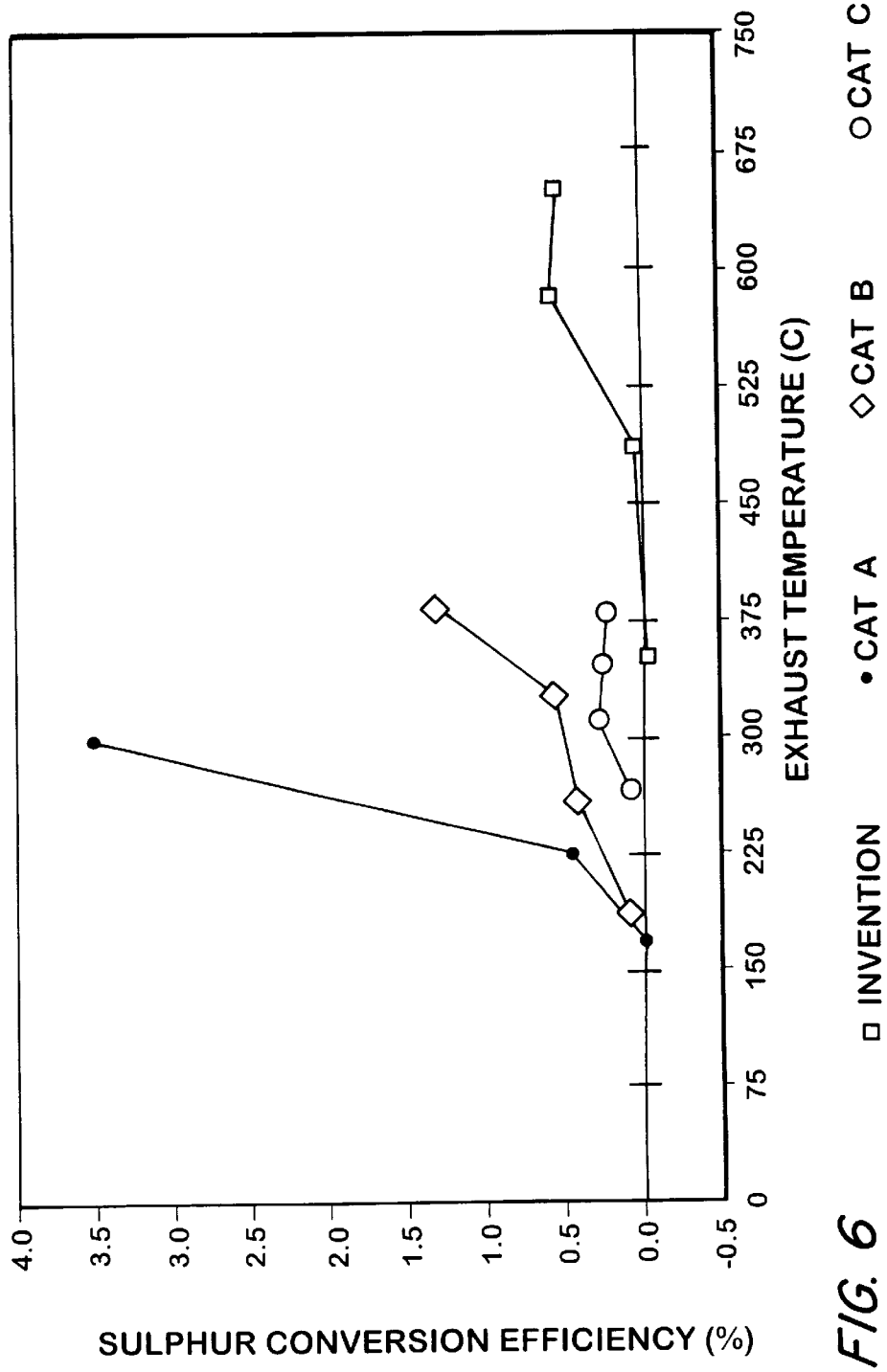
FIG. 6 is a graph, similar to that of FIG. 5, but showing the selectively of the invention on sulfur conversion.

In order to assess catalyst systems, a comparison is made between the conversion efficiency for gaseous hydrocarbons and the conversion efficiency for sulfur in the fuel that occurs in the catalysts over a range of conditions. In FIGS. 5 and 6 results are shown for HC and fuel sulfur conversion efficiency for the platinum additive and trap as tested in Example 1 and three catalysts on the exhaust of uncatalyzed diesel fuel. Catalyst A was an active catalyst with high conversion efficiency and catalysts B and C were more selective formulations which have suppressed sulfur conversion at the expense of some loss of HC conversion. The horizontal axis in the figures is the inlet temperature to the catalyst.

Figure 7:
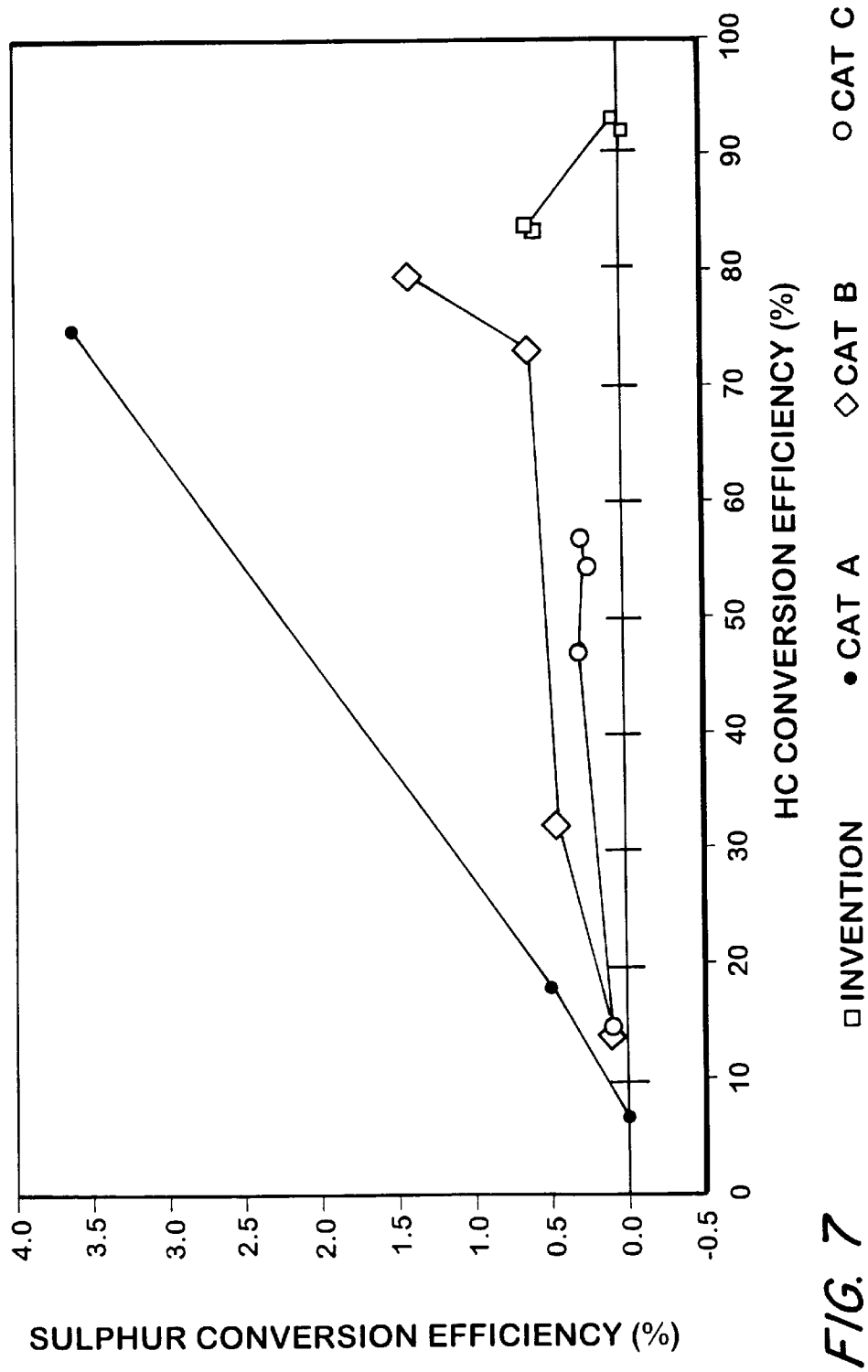
FIG. 7 is a graph presenting the data for FIGS. 5 and 6 to illustrate the tradeoff between sulfur and hydrocarbon conversion.

The HC conversion efficiency (FIG. 5) for the platinum additive and trap combination is as high as the most active catalyst A but the sulfur conversion efficiency (FIG. 6) is much lower and stays below 1% up to 670° C. This is further illustrated by FIG. 7 which shows the same data as a trade-off between sulfur and HC conversion. In this figure the optimum is to have a system which operates in the bottom right hand corner, maximizing HC conversion with little sulfur conversion (sulfate generation) penalty on particulates. The platinum additive and trap combination is clearly excellent in this respect.

EXAMPLE 3

A test has been carried out to assess the effect of a diesel fuel to which is added a platinum group metal catalyst composition and compare that to baseline with no aditive and to a diesel fuel containing a fuel soluble auxiliary catalyst metal composition containing copper on the performance and emissions of a heavy duty diesel engine fitted with a non-catalyzed particulate trap.

The platinum group metal catalyst composition is added with a fuel additive having the formulation of the Example 1 and was mixed with the fuel at a dosage rate of 1:1560 by volume (0.25 ppm, Pt). The copper compound was present in the fuel at a level to give a dosage of 30 ppm copper in the fuel.

The effect of the additives on particulate trap regeneration characteristics was also evaluated.

The following trends were observed for the platinum additive:

Platinum was effective in reducing engine out CO emissions and engine out HC emissions, see Table 1 below

TABLE 1

|  |  | Engine Load at 1500 rev/min | | | | |
|---|---|---|---|---|---|---|
| FUEL |  | 10% | 25% | 50% | 75% | 100% |
| Baseline (Rpt2) | CO (g/kWh) | 2.96 | 1.04 | 0.95 | 0.98 | 1.87 |
| Base + PI (Test 1) |  | 2.54 | 1.00 | 0.52 | 0.45 | 0.96 |
|  | % change | 14.2 | 3.8 | 45.3 | 54.1 | 48.7 |
| Baseline (Rpt2) | HC (g/kWh) | 2.50 | 0.70 | 0.26 | 0.21 | 0.18 |
| Base + PI (Test 1) |  | 1.87 | 0.58 | 0.23 | 0.18 | 0.18 |
|  | % change | 25.2 | 17.1 | 11.5 | 14.3 | 0 |

Platinum reduced after trap CO emissions by 60% at most test points.

The platinum additive gave a slight improvement in average engine out (15%) and consequently after trap (19%) particulate emissions.

The platinum additive reduced the particulate trap balance point temperature by 59° C. to 471° C.

Platinum by itself had no specific effect on $NO_x$ emissions.

Results from monitoring engine emissions and the cycle results show that the improvements in CO and HC are directly related to run time on platinum.

The following overall trends were observed for the platinum plus copper additive combination:

The trends observed were similar to those seen for platinum alone.

The main effect observed for platinum plus copper was its influence on particulate trap regeneration characteristics. This is measured by preloading the trap with particulates and then increasing load to a point where particulate levels on the trap do not increase due to being burned off. The temperature at which this occurs is the balance point.

The balance point temperature for platinum plus copper treatment was 273° C. (257° C. lower than the baseline). The additives gave several tangible benefits with no discernible adverse affects on regulated emissions. The effect of the platinum plus copper additive on trap regeneration characteristics offers an attractive solution to the traditional problems of non-catalyzed wall flow particulate traps.

EXAMPLE 4

Another diesel fuel additive containing a platinum group metal catalyst composition has the following formulation and is mixed with the fuel at a dosage rate of 1:400 by volume (0.09 ppm Pt and 0.07 ppm Pd):

| Component | Parts |
| --- | --- |
| Pd Diphenyl Cyclooctadiene Cordination Compound | 0.0085 |
| Pd(acetyl acetonate)$_2$ | 0.0085 |
| Ethyl D$_{H}$-3 Octyl Nitrate | 28.4 |
| Ethyl EDA-2 Detergent | 3.5 |
| Xylene | 2.6 |
| Exxon LOPS Mineral Spirits | 65.5 |

EXAMPLE 5

Another diesel fuel additive containing a platinum group metal catalyst composition has the following formulation and is mixed with the fuel at a dosage rate of 1:400 by volume (0.15 ppm Pd).

| Component | Parts |
| --- | --- |
| Pd(acetyl acetonate)$_2$ | 0.017 |
| Oleic Acid Diethanolamide | 49.983 |
| Kerosene | 50.0 |

EXAMPLE 6

The procedures of Example 3 were repeated, but this time adding to the beginning of the test procedure a conditioning procedure wherein the platinum fuel additive composition was employed at a concentration giving 0.50 ppm platinum metal in the fuel. The conditioning period was run for 50 hours after a new trap was fitted. Hydrocarbon emissions (less than 10 ppm) and carbon monoxide (less than 0.005 %) were considered extremely low. The balance point at this time was found to between 475 and 500° C.

The test fuel was then changed to one containing 0.25 ppm platinum and the hydrocarbon emissions and carbon monoxide were found to increase slightly and the balance point remained between 475 and 500° C.

The test fuel was then changed to one containing 0.25 ppm platinum and 30 ppm copper. Following a conditioning period of 8 hours, the balance point was found to be between 350 and 375° C.

The test fuel was again changed to the 0.25 ppm platinum additive alone and the balance point was again determined after overnight operation and found to be between 475 and 500° C.

EXAMPLE 7

The procedures of Example 3 were again repeated, but this time using a cerium compound (Rhone Poulenc DP-06, cerium fatty acid soap) in place of the copper additive and adding to the beginning of the test procedure a conditioning procedure wherein the platinum fuel additive composition was employed at a concentration giving 0.50 ppm platinum metal in the fuel.

Baseline data with no additve was not retaken, given the similar set up to that of Example 3 (the same engine and a similar, although not identical, trap). The conditioning period with 0.50 ppm platinum was run for 50 hours after the new trap was fitted. Emissions of NO$_x$, unburned hydrocarbons, carbon monoxide and particulates were monitored.

The test fuel was then changed to one containing 0.25 ppm platinum and the engine was conditioned for another eight hours.

The test fuel was then changed to one containing 0.25 ppm platinum and 30 ppm cerium. Following a conditioning period of 8 hours, the emissions of NO$_x$, unburned hydrocarbons, carbon monoxide and particulates were monitored. The results are presented in the following Table 2.

TABLE 2

| Fuel | Before/After Trap | NO$_x$ (g/kWh) | HC (g/kWh) | CO (g/kWh) | Particulates (g/kWh) |
| --- | --- | --- | --- | --- | --- |
| Baseline - Ex.3 (No additive) | Before (A) | 13.65 | 0.63 | 1.9 | 0.2 |
|  | After (B) | 12.94 | 0.49 | 2.0 | 0.08 |
|  | Δ across trap | −5.2% | −22% | +5.2% | −60% |
| Base + Pt + Ce | Before (C) | 13.67 | 0.37 | 1.27 | 0.23 |
|  | After (D) | 12.84 | 0.23 | 1.03 | 0.05 |
|  | Δ across trap | −6.07% | −37% | −18% | −78% |
|  | Change (A–C) | +0.15 | −41% | −33% | +15% |
|  | Change (B–D) | −0.8% | −53% | −35% | −37% |
|  | Change (A–D) | −5.9% | −63% | −46% | −75% |

The test fuel was again supplied with the 0.25 ppm platinum and 30 ppm of the cerium, and the balance point was determined to be between 425 and 450° C.

The above description is for the purpose of teaching the person of ordinary skill in the art how to practice the present invention, and it is not intended to detail all of those obvious modifications and variations of it which will become apparent to the skilled worker upon reading this description. It is intended, however, that all such obvious modifications and variations be included within the scope of the present invention which is defined by the following claims. The claims cover the indicated components and steps in all arrangements and sequences which are effective to meet the objectives intended for the invention, unless the context specifically indicates the contrary.

We claim:

1. A method for improving the operation of a diesel engine equipped with a diesel trap, comprising:

adding a platinum group metal composition and a cerium compound to a diesel fuel in an effective amount to lower the emissions of unburned hydrocarbons and carbon monoxide and to lower the temperature at which particulates are burned from the trap;

operating the diesel engine by burning the fuel over a sufficient period of time to produce exhaust gases and achieve a sustained reduction in unburned hydrocarbons and carbon monoxide; and passing the exhaust gases from the operation of the engine through the diesel trap whereby particulates are collected in the trap and burned therein at a temperature lower than could be achieved in the absence of the platinum group metal and the cerium.

2. A method according to claim 1 wherein platinum group metal catalyst is present in the fuel in amounts effective to reduce the balance point temperature of the trap by at least 50° C.

3. A method according to claim 1 wherein the platinum group metal catalyst composition is employed at a level sufficient to supply 0.05 to about 1.0 ppm of platinum group metal and the cerium compound is employed at a level effective to supply from about 1 to about 100 ppm of cerium metal, both based on the fuel combusted.

4. A method of claim 1 wherein said diesel engine is modified by retarding engine timing or recirculating exhaust gas effectively to reduce $NO_x$ emissions.

5. A method for improving the operation of a diesel engine by lowering the emissions of unburned hydrocarbons and carbon monoxide, comprising:

providing a diesel fuel and combustion air;

providing a platinum group metal catalyst composition selected from the group consisting of alcoholates, sulfonates, beta-diketonates, soaps, and mixtures of these;

combusting the fuel in a diesel engine to produce exhaust gases;

and, directing exhaust gases into an exhaust system, wherein the platinum group metal catalyst composition is introduced into the fuel, exhaust gases or.combustion air, in amounts effective to provide platinum group metal in the exhaust system at a level of up to 1 ppm based on the volume of fuel burned to produce the exhaust gases.

6. A method of claim 5, wherein the platinum group metal composition comprises a soap of a fatty acid, selected from the group consisting of stearates, palmitates, laurates, tallates, napthanates, and mixtures of these.

7. A method according to claim 5 wherein the platinum group metal catalyst composition is employed at a level sufficient to supply 0.05 to about 1.0 ppm of platinum group metal, and also provided is a cerium compound employed at a level effective to supply from about 1 to about 100 ppm of cerium metal, both concentrations based on the fuel combusted.

8. A method according to claim 7 wherein the exhaust system includes a trap and the platinum group metal catalyst and the cerium metal are present in the fuel in amounts effective to reduce the balance point temperature of the trap by at least 500° C., the platinum group metal catalyst composition being employed at a level sufficient to supply 0.10 to 0.5 ppm of platinum group metal and the auxiliary catalyst metal composition being employed at a level effective to supply from 20 to 60 ppm of cerium in the fuel.

9. A method of claim 5 wherein said diesel engine is modified by retarding engine timing or recirculating exhaust gas effectively to reduce $NO_x$ emissions.

10. A method for operating a diesel engine with reduced emissions of $NO_x$, particulates, gaseous hydrocarbons and carbon monoxide, comprising:

providing a diesel engine and a source of diesel fuel;

providing a combustion air mixture including incoming air and exhaust gases from a previous combustion cycle of the engine;

providing a platinum group metal catalyst composition and an auxiliary catalytic metal composition comprising cerium;

introducing the combustion air mixture into the cylinder of a diesel engine;

compressing the combustion air within the cylinder;

injecting the diesel fuel into the cylinder of a diesel engine;

combusting the fuel to produce exhaust gases;

directing the exhaust gases into an exhaust system including a diesel trap to remove particulates from the exhaust gases; and, mixing a portion of the exhaust gases with incoming combustion air to provide a combustion air mixture for a subsequent combustion cycle;

wherein the amount of exhaust gases present in the combustion air mixture in the cylinder of the diesel engine is effective to lower the production of $NO_x$ by the engine utilizing said combustion air mixture as compared to combustion air not containing exhaust gases; and wherein a platinum group metal catalyst composition and the auxiliary catalytic metal composition are present in the fuel, combustion air mixture, or exhaust gases in amounts effective to provide sufficient platinum group metal and auxiliary catalyst metal in the exhaust system to lower the emissions of unburned hydrocarbons and carbon monoxide and to lower the balance point of the trap.

11. A method according to claim 10 wherein said portion of the exhaust gases that is mixed with incoming combustion air, is so mixed after passing through the particulate trap.

12. A method according to claim 10 wherein said platinum group metal catalyst composition is an alcoholate, sulfonate, beta-diketonate or a soap selected from the group consisting of stearates, palmitates, laurates, tallates, napthanates, other fatty acid soaps, and mixtures of two or more of these.

13. A method according to claim 10 wherein said platinum group metal catalyst composition is a fuel-soluble composition and is employed in the fuel at a level sufficient to supply 0.05 to about 1.0 ppm of platinum group metal, and the auxiliary catalytic metal composition is employed in the fuel in an amount to provide a concentration of from about 1 to 100 ppm cerium.

14. A method according to claim 13 wherein platinum group metal catalyst and the auxiliary catalytic metal are present in the fuel in amounts effective to reduce the balance point temperature of the trap by at least 50° C., the platinum group metal catalyst composition being employed at a level sufficient to supply 0.10 to 0.5 ppm of platinum group metal and the auxiliary catalyst metal composition being employed at a level effective to supply from 20 to 60 ppm of cerium in the fuel.

15. A method for improving the operation of a diesel engine including a diesel trap by lowering the emissions of $NO_x$, unburned hydrocarbons and carbon monoxide, while also reducing the balance point of the trap, the method comprising:

providing a diesel engine and a source of diesel fuel;

providing a platinum group metal catalyst composition and an auxiliary catalytic metal composition containing at least one of copper and cerium;

introducing combustion air into the cylinder of a diesel engine;

compressing the combustion air within the cylinder;

injecting the diesel fuel into the cylinder of a diesel engine, the injection timing of the diesel engine being set in a manner designed to reduce the nitrogen oxides emissions from the engine after combustion of a diesel fuel;

combusting the fuel to produce exhaust gases containing particulates and platinum group metal catalyst and the auxiliary catalytic metal;

and, directing exhaust gases into an exhaust system including a diesel trap which removes at least a portion of the particulates from the exhaust gases, wherein the platinum group metal catalyst composition and the auxiliary catalytic metal composition are introduced into the fuel, exhaust gases or combustion air, in amounts effective to provide sufficient platinum group metal and auxiliary catalyst metal in the exhaust system to lower the balance point temperature of particulates in the trap and to reduce emissions of unburned hydrocarbons and carbon monoxide.

16. A method for according to claim 15 wherein: said auxiliary catalytic metal composition contains at least one metal metal selected from the group consisting of calcium, magnesium, manganese, iron, sodium, lithium, potassium, and mixtures thereof.

17. A method according to claim 15 wherein the platinum group metal catalyst composition is employed at a level sufficient to supply 0.05 to 1.0 ppm of platinum group metal and the auxiliary catalyst metal composition is employed at a level effective to supply from 1 to 100 ppm of the auxiliary catalyst metal, based on the fuel combusted.

18. A method of claim 15, wherein said platinum group metal composition has a breakdown temperature of at least about 50° C., and a partition ratio of said platinum metal composition of at least about 25.

19. A method according to claim 15 wherein said platinum group metal catalyst composition is an alcoholate, sulfonate, beta-diketonate or a soap selected from the group consisting of stearates, palmitates, laurates, tallates, napthanates, other fatty acid soaps, and mixtures of two or more of these.

20. A method for improving the operation of a diesel engine exhaust system comprising:

adding a platinum group metal composition and at one least auxiliary catalytic metal composition selected from the group consisting of compounds of sodium, lithium, potassium, cerium, iron, copper, calcium, magnesium, manganese, and mixtures of these, to a diesel fuel in effective amount such that exhaust produced by combustion catalyzes the exhaust system including a diesel trap effectively to lower the emissions of unburned hydrocarbons and carbon monoxide;

operating a diesel engine by burning the fuel; and passing the exhaust from the operation of the engine through the exhaust system including the diesel trap to reduce the emissions of particulates, hydrocarbons and carbon monoxide and reduce the balance point for the trap.

21. A method for improving the operation of a diesel engine including a diesel trap by lowering the emissions of $NO_x$, unburned hydrocarbons and carbon monoxide, while also reducing the balance point of the trap, the method comprising:

providing a diesel engine and a source of diesel fuel;

providing a platinum group metal catalyst composition and an auxiliary catalytic metal composition containing cerium;

introducing combustion air into the cylinder of a diesel engine;

compressing the combustion air within the cylinder;

injecting the diesel fuel into the cylinder of a diesel engine, thereby combusting the fuel to produce exhaust gases containing particulates and platinum group metal catalyst and cerium catalyst;

and, directing exhaust gases into an exhaust system including a diesel trap which removes at least a portion of the particulates from the exhaust gases, wherein the platinum group metal catalyst composition and the auxiliary catalytic metal composition are introduced into the fuel, exhaust gases or combustion air, in amounts effective to provide sufficient platinum group metal and cerium catalyst in the exhaust system to lower the balance point temperature of particulates in the trap and to reduce emissions of particulates, unburned hydrocarbons and carbon monoxide.

22. A method for improving the operation of a diesel engine including a diesel trap by lowering the emissions of $NO_x$, unburned hydrocarbons and carbon monoxide, while also reducing the balance point of the trap, the method comprising:

providing a diesel engine and a source of diesel fuel;

providing a platinum group metal catalyst composition and an auxiliary catalytic metal composition selected from the group consisting of compounds of sodium, lithium, potassium, cerium, iron, copper, calcium, magnesium, manganese, and mixtures;

introducing combustion air into the cylinder of a diesel engine;

compressing the combustion air within the cylinder;

injecting the diesel fuel into the cylinder of a diesel engine, thereby combusting the fuel to produce exhaust gases containing particulates and platinum group metal catalyst and auxiliary catalytic metal;

and, directing exhaust gases into an exhaust system including a diesel trap which removes at least a portion of the particulates from the exhaust gases, wherein the platinum group metal catalyst composition and the auxiliary catalytic metal composition are introduced.into the fuel, exhaust gases or combustion air, in amounts effective to provide sufficient platinum group metal and auxiliary catalytic metal in the exhaust system to lower the balance point temperature of particulates in the trap and to reduce emissions of particulates, unburned hydrocarbons and carbon monoxide.

* * * * *